United States Patent
Venugopal et al.

(10) Patent No.: US 11,985,531 B2
(45) Date of Patent: May 14, 2024

(54) TECHNIQUES FOR REPORTING MULTIPLE QUANTITY TYPES

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/468,330

(22) Filed: Sep. 7, 2021

(65) Prior Publication Data
US 2022/0078655 A1  Mar. 10, 2022

Related U.S. Application Data

(60) Provisional application No. 63/076,229, filed on Sep. 9, 2020.

(51) Int. Cl.
*H04W 24/10* (2009.01)
*H04W 72/21* (2023.01)
(Continued)

(52) U.S. Cl.
CPC ........... *H04W 24/10* (2013.01); *H04W 72/21* (2023.01); *H04W 72/23* (2023.01); *H04W 72/542* (2023.01)

(58) Field of Classification Search
CPC ... H04W 24/10; H04W 72/542; H04W 72/21; H04W 72/23
(Continued)

(56) References Cited

U.S. PATENT DOCUMENTS

| 2019/0190582 A1 | 6/2019 | Guo et al. |
| 2020/0120525 A1* | 4/2020 | da Silva ................ H04W 16/28 |
| 2023/0246785 A1* | 8/2023 | Grossmann ........... H04L 5/0057 370/329 |

FOREIGN PATENT DOCUMENTS

| CA | 3108245 A1 | 2/2020 | |
| WO | WO 2021/254954 | * 9/2020 | ............... H04L 5/00 |

OTHER PUBLICATIONS

International Search Report and Written Opinion—PCT/US2021/049393—ISA/EPO—dated Dec. 8, 2021.
(Continued)

*Primary Examiner* — Christopher R Crompton
(74) *Attorney, Agent, or Firm* — Holland & Hart LLP

(57) ABSTRACT

Methods, systems, and devices for wireless communications are described. A user equipment (UE) may receive, from a base station, a configuration message indicating a first reporting quantity type and a second reporting quantity type for generating a measurement report. The UE may determine a measurement payload size to use for generating a measurement payload for the first reporting quantity type and the second reporting quantity type. The UE may measure a first set of resources in accordance with the first reporting quantity type and a second set of resources in accordance with the second reporting quantity type. The UE may transmit, to the base station, the measurement report including a first measurement payload having the measurement payload size for the first reporting quantity type and a second measurement payload having the measurement payload size for the second reporting quantity type.

30 Claims, 16 Drawing Sheets

(51) Int. Cl.
*H04W 72/23* (2023.01)
*H04W 72/542* (2023.01)

(58) Field of Classification Search
USPC .......................................... 370/252
See application file for complete search history.

(56) References Cited

OTHER PUBLICATIONS

Kaikkonen, J., et al., "Main Radio Interface Related System Procedures," Apr. 24, 2020 (Apr. 24, 2020), XP055845846, 136 Pages, Retrieved from the Internet: URL:https://onlinelibrary.wiley.com/doi/pdfdirect/10.1002/9781119582335.ch4 [retrieved on Sep. 29, 2021], Section 4.4, p. 1-p. I, Sections 4.2.4.3, 4.3.2.8.7, 4.3.2.9, 4.3.3.2.3, 4.3.5, and 4.5.1, Figures 4.58-4.59, Table 4.16.

* cited by examiner

TECHNIQUES FOR REPORTING MULTIPLE QUANTITY TYPES

CROSS REFERENCE

The present Application for Patent claims the benefit of U.S. Provisional Patent Application No. 63/076,229 by VENUGOPAL et al., entitled "TECHNIQUES FOR REPORTING MULTIPLE QUANTITY TYPES," filed Sep. 9, 2020, assigned to the assignee hereof, and expressly incorporated by reference herein.

FIELD OF TECHNOLOGY

The following relates to wireless communications, including techniques for reporting multiple quantity types.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may communicate using one or more directional beams and may attempt to maintain a reliable communication link between the base station and the UE by performing a beam management procedure. In such a procedure, a base station may configure a UE to measure one or more beams or beam-related resources and to report the one or more measurements to the base station. Conventional techniques for reporting the one or more measurements may be deficient.

SUMMARY

The described techniques relate to improved methods, systems, devices, and apparatuses that support techniques for reporting multiple quantity types. Generally, the described techniques provide for enhanced beam management procedures. To maintain a reliable communication link between a base station and a user equipment (UE), a UE may receive, from a base station, a configuration message indicating a first reporting quantity type (e.g., reference signal received power (RSRP), signal-to-noise-plus-interference ratio (SINR)) and a second reporting quantity type (e.g., RSRP, SINR) for generating a measurement report. The first reporting quantity type and the second reporting quantity type may be different. The UE may determine a measurement payload size to use for generating a measurement payload for the first reporting quantity type and the second reporting quantity type. The UE may measure a first set of resources in accordance with the first reporting quantity type and a second set of resources in accordance with the second reporting quantity type. The first set of resources and the second set of resources may be the same or different. In some cases, the UE may generate a first measurement payload having the measurement payload size based on measuring the first set of resources, and the UE may generate a second measurement payload having the measurement payload size based on measuring the second set of resources. The UE may transmit, to the base station, the measurement report including the first measurement payload having the measurement payload size for the first reporting quantity type and the second measurement payload having the measurement payload size for the second reporting quantity type.

A method of wireless communications at a UE is described. The method may include receiving, from a base station, a configuration message indicating a first reporting quantity type and a second reporting quantity type for generating a measurement report, determining a measurement payload size to use for generating a measurement payload for the first reporting quantity type and second reporting quantity type, and transmitting, to the base station, the measurement report including a first measurement payload having the measurement payload size for the first reporting quantity type and a second measurement payload having the measurement payload size for the second reporting quantity type.

An apparatus for wireless communications at a UE is described. The apparatus may include a processor, memory coupled with the processor, and instructions stored in the memory. The instructions may be executable by the processor to cause the apparatus to receive, from a base station, a configuration message indicating a first reporting quantity type and a second reporting quantity type for generating a measurement report, determine a measurement payload size to use for generating a measurement payload for the first reporting quantity type and second reporting quantity type, and transmit, to the base station, the measurement report including a first measurement payload having the measurement payload size for the first reporting quantity type and a second measurement payload having the measurement payload size for the second reporting quantity type.

Another apparatus for wireless communications at a UE is described. The apparatus may include means for receiving, from a base station, a configuration message indicating a first reporting quantity type and a second reporting quantity type for generating a measurement report, determining a measurement payload size to use for generating a measurement payload for the first reporting quantity type and second reporting quantity type, and transmitting, to the base station, the measurement report including a first measurement payload having the measurement payload size for the first reporting quantity type and a second measurement payload having the measurement payload size for the second reporting quantity type.

A non-transitory computer-readable medium storing code for wireless communications at a UE is described. The code may include instructions executable by a processor to receive, from a base station, a configuration message indicating a first reporting quantity type and a second reporting quantity type for generating a measurement report, determine a measurement payload size to use for generating a measurement payload for the first reporting quantity type and second reporting quantity type, and transmit, to the base station, the measurement report including a first measurement payload having the measurement payload size for the first reporting quantity type and a second measurement payload having the measurement payload size for the second reporting quantity type.

In some examples of the method, apparatuses, and non-transitory computer-readable medium described herein, receiving the configuration message may include operations, features, means, or instructions for receiving the configuration message that indicates to use, as the measurement payload size, a larger of a first payload size associated with the first reporting quantity type and a second payload size associated with the second reporting quantity type.

In some examples of the method, apparatuses, and non-transitory computer-readable medium described herein, receiving the configuration message may include operations, features, means, or instructions for receiving the configuration message that indicates the measurement payload size, where the measurement payload size may be determined based on the configuration message.

In some examples of the method, apparatuses, and non-transitory computer-readable medium described herein, receiving the configuration message further may include operations, features, means, or instructions for receiving the configuration message including an indication of a first subset of measurement resources of a set of measurement resources on which to report in accordance with the first reporting quantity type and a second subset of measurement resources of the set of measurement resources on which to report in accordance with the second reporting quantity type.

In some examples of the method, apparatuses, and non-transitory computer-readable medium described herein, receiving the configuration message may include operations, features, means, or instructions for receiving the configuration message including an indication of a set of measurement resources on which to report in accordance with the first reporting quantity type and the second reporting quantity type.

In some examples of the method, apparatuses, and non-transitory computer-readable medium described herein, determining the measurement payload size may include operations, features, means, or instructions for receiving control signaling indicating the measurement payload size.

In some examples of the method, apparatuses, and non-transitory computer-readable medium described herein, receiving the control signaling may include operations, features, means, or instructions for receiving the control signaling that may be a radio resource control message, a medium access control element message, or a downlink control information message.

Some examples of the method, apparatuses, and non-transitory computer-readable medium described herein may further include operations, features, means, or instructions for receiving, from the base station, a radio resource control reconfiguration message based on the measurement report including the first measurement payload and the second measurement payload.

In some examples of the method, apparatuses, and non-transitory computer-readable medium described herein, determining the measurement payload size may include operations, features, means, or instructions for determining the measurement payload size based on a larger of a first payload size associated with the first reporting quantity type and a second payload size associated with the second reporting quantity type.

Some examples of the method, apparatuses, and non-transitory computer-readable medium described herein may further include operations, features, means, or instructions for generating the second measurement payload by adding one or more bits to a payload of the second reporting quantity type based on the first payload size being larger than the second payload size.

In some examples of the method, apparatuses, and non-transitory computer-readable medium described herein, receiving the configuration message may include operations, features, means, or instructions for receiving the configuration message that indicates to use a reference measurement payload size as the measurement payload size.

In some examples of the method, apparatuses, and non-transitory computer-readable medium described herein, determining the measurement payload size further may include operations, features, means, or instructions for determining the measurement payload size that may be a reference measurement payload size for the UE to use when generating a measurement payload associated with each of the first and second reporting quantity types.

Some examples of the method, apparatuses, and non-transitory computer-readable medium described herein may further include operations, features, means, or instructions for generating the first measurement payload by adding one or more bits to a payload of the first reporting quantity type to generate the first measurement payload having the reference measurement payload size based on a payload size of the payload of the first reporting quantity type being less than the reference measurement payload size.

Some examples of the method, apparatuses, and non-transitory computer-readable medium described herein may further include operations, features, means, or instructions for generating the first measurement payload by removing one or more bits from a payload of the first reporting quantity type to generate the first measurement payload having the reference measurement payload size based on a payload size of the payload of the first reporting quantity type being greater than the reference measurement payload size.

Some examples of the method, apparatuses, and non-transitory computer-readable medium described herein may further include operations, features, means, or instructions for generating the first measurement payload by rounding a payload of the first reporting quantity type to generate the first measurement payload having the reference measurement payload size based on a payload size of the payload of the first reporting quantity type being greater than the reference measurement payload size.

In some examples of the method, apparatuses, and non-transitory computer-readable medium described herein, determining the measurement payload size may include operations, features, means, or instructions for retrieving the measurement payload size from a memory of the UE.

In some examples of the method, apparatuses, and non-transitory computer-readable medium described herein, determining the measurement payload size further may include operations, features, means, or instructions for determining a total payload size or a per-report payload size to use for generating the first measurement payload and the second measurement payload, and determining the measurement payload size for each of the first reporting quantity type and the second reporting quantity type based on the total payload size or the per-report payload size.

Some examples of the method, apparatuses, and non-transitory computer-readable medium described herein may further include operations, features, means, or instructions for retrieving the total payload size or the per-report payload size from a memory of the UE.

Some examples of the method, apparatuses, and non-transitory computer-readable medium described herein may further include operations, features, means, or instructions for receiving control signaling indicating the total payload size or the per-report payload size.

In some examples of the method, apparatuses, and non-transitory computer-readable medium described herein, the first reporting quantity type and the second reporting quantity type may be one of a layer 1 reference signal received power measurement, or a layer 1 signal-to-interference-plus-noise ratio measurement, where the first reporting quantity type and the second reporting quantity type may be different.

In some examples of the method, apparatuses, and non-transitory computer-readable medium described herein, receiving the configuration message may include operations, features, means, or instructions for receiving the configuration message including an indication of a set of measurement resources that correspond to a set of transmission beams.

Some examples of the method, apparatuses, and non-transitory computer-readable medium described herein may further include operations, features, means, or instructions for measuring at least a subset of a set of measurement resources in accordance with the first reporting quantity type, and measuring at least a subset of a set of measurement resources in accordance with the second reporting quantity type.

A method of wireless communications at a base station is described. The method may include transmitting, to a UE, a configuration message indicating a first reporting quantity type and a second reporting quantity type for generating a measurement report and receiving, from the UE, the measurement report including a first measurement payload having a measurement payload size for the first reporting quantity type and a second measurement payload having the measurement payload size for the second reporting quantity type.

An apparatus for wireless communications at a base station is described. The apparatus may include a processor, memory coupled with the processor, and instructions stored in the memory. The instructions may be executable by the processor to cause the apparatus to transmit, to a UE, a configuration message indicating a first reporting quantity type and a second reporting quantity type for generating a measurement report and receive, from the UE, the measurement report including a first measurement payload having a measurement payload size for the first reporting quantity type and a second measurement payload having the measurement payload size for the second reporting quantity type.

Another apparatus for wireless communications at a base station is described. The apparatus may include means for transmitting, to a UE, a configuration message indicating a first reporting quantity type and a second reporting quantity type for generating a measurement report and receiving, from the UE, the measurement report including a first measurement payload having a measurement payload size for the first reporting quantity type and a second measurement payload having the measurement payload size for the second reporting quantity type.

A non-transitory computer-readable medium storing code for wireless communications at a base station is described. The code may include instructions executable by a processor to transmit, to a UE, a configuration message indicating a first reporting quantity type and a second reporting quantity type for generating a measurement report and receive, from the UE, the measurement report including a first measurement payload having a measurement payload size for the first reporting quantity type and a second measurement payload having the measurement payload size for the second reporting quantity type.

In some examples of the method, apparatuses, and non-transitory computer-readable medium described herein, transmitting the configuration message further may include operations, features, means, or instructions for transmitting the configuration message including an indication of a first subset of measurement resources of a set of measurement resources on which to report in accordance with the first reporting quantity type and a second subset of measurement resources of the set of measurement resources on which to report in accordance with the second reporting quantity type.

In some examples of the method, apparatuses, and non-transitory computer-readable medium described herein, transmitting the configuration message may include operations, features, means, or instructions for transmitting the configuration message including an indication of a set of measurement resources on which to report in accordance with the first reporting quantity type and the second reporting quantity type.

Some examples of the method, apparatuses, and non-transitory computer-readable medium described herein may further include operations, features, means, or instructions for transmitting, to the UE, a radio resource control reconfiguration message based on the measurement report including the first measurement payload and the second measurement payload.

Some examples of the method, apparatuses, and non-transitory computer-readable medium described herein may further include operations, features, means, or instructions for transmitting control signaling indicating the measurement payload size.

In some examples of the method, apparatuses, and non-transitory computer-readable medium described herein, transmitting the control signaling may include operations, features, means, or instructions for transmitting the control signaling that may be a radio resource control message, a medium access control element message, or a downlink control information message.

In some examples of the method, apparatuses, and non-transitory computer-readable medium described herein, transmitting the configuration message may include operations, features, means, or instructions for transmitting the configuration message that indicates the measurement payload size.

In some examples of the method, apparatuses, and non-transitory computer-readable medium described herein, transmitting the configuration message may include operations, features, means, or instructions for transmitting the configuration message that indicates to use, as the measurement payload size, a larger of a first payload size associated with the first reporting quantity type and a second payload size associated with the second reporting quantity type.

In some examples of the method, apparatuses, and non-transitory computer-readable medium described herein, transmitting the configuration message may include operations, features, means, or instructions for transmitting the configuration message that indicates to use a reference measurement payload size as the measurement payload size.

Some examples of the method, apparatuses, and non-transitory computer-readable medium described herein may further include operations, features, means, or instructions for transmitting control signaling indicating a total payload size or a per-report payload size, where the measurement payload size may be determined based on the control signaling.

In some examples of the method, apparatuses, and non-transitory computer-readable medium described herein, the first reporting quantity type and the second reporting quantity type may be one of a layer 1 reference signal received power measurement, or a layer 1 signal-to-interference-plus-noise ratio measurement, where the first reporting quantity type and the second reporting quantity type may be different.

In some examples of the method, apparatuses, and non-transitory computer-readable medium described herein, transmitting the configuration message may include operations, features, means, or instructions for transmitting the configuration message including an indication of a set of measurement resources that correspond to a set of transmission beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
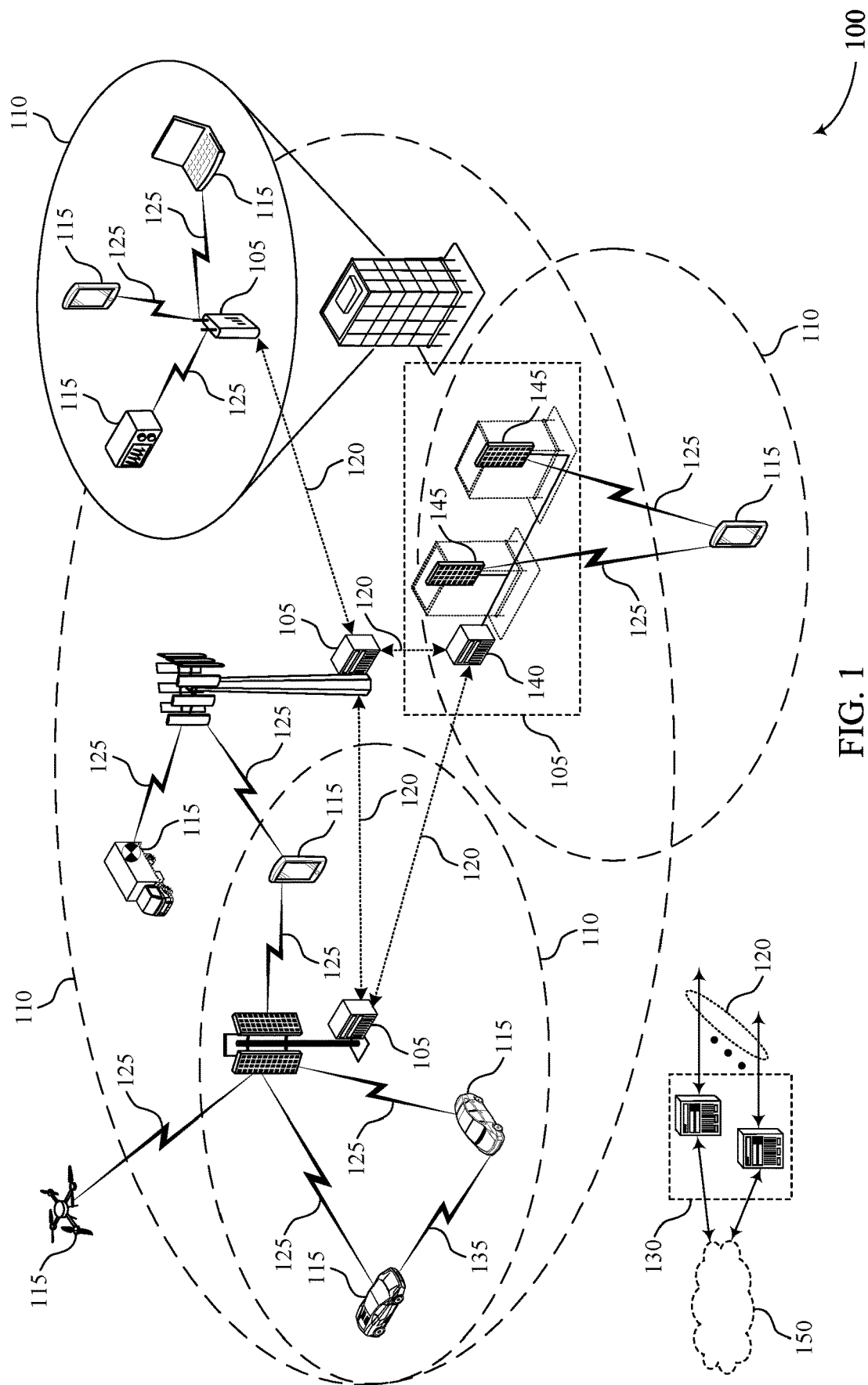
FIG. 1 illustrates an example of a wireless communications system that supports techniques for reporting multiple quantity types in accordance with aspects of the present disclosure.

In some wireless communications systems, a base station and a user equipment (UE) may attempt to maintain reliable communications over a communication link by communicating using a beam or a channel that provides a sufficiently high signal strength for transmissions between the base station and the UE. In some cases, the base station and the UE may perform a number of beam management procedures to facilitate selection (or maintenance) of an appropriate beam or channel. In such cases, the UE may receive one or more measurement related signals (e.g., channel state information reference signals (CSI-RSs), synchronization signal blocks (SSB)) from the base station over one or more resources (e.g., time resources, frequency resources, beams). The UE may measure the one or more signals in accordance with a reporting quantity. For example, the UE may be configured to measure the received power of the signal (e.g., reference signal received power (RSRP)), or a quality of the signal (e.g., signal-to-noise-plus-interference ratio (SINR)). The UE may transmit a measurement report to the base station including the measurements of the signals. For example, the UE may transmit RSRP measurements of the signals, or SINR of the signals, but not both in a single report. The base station may use the measurement report to select or reconfigure a beam or a channel to use for communication with the UE. For example, each signal (e.g., CSI-RS or SSB) transmitted by the base station may correspond to a beam or a channel and the base station may select a beam or a channel corresponding to the signal (e.g., CSI-RS or SSB) associated with the most preferred reporting quantity (e.g., highest RSRP of the reported measurements, the highest SINR of the reported measurements).

In some cases, a base station may configure the UE to measure multiple reporting quantities, such as a RSRP reporting quantity type and a SINR reporting quantity type, of the one or more signals. However, reporting quantities may each have a different payload size that is required to transmit each reporting quantity. As such, conventional techniques may not support transmitting different reporting quantities in the same report. In such cases, the base station may configure the UE to transmit multiple reports, where each report may be associated with a different reporting quantity, which may increase latency and overhead in the beam management procedure.

To reduce latency and overhead, a UE may be configured to report multiple reporting quantity types within the same report. In some cases, the UE may be configured to align payload sizes of different reporting quantity types that are to be included in a single report such that each individual measurement payload is the same size within the report. For example, a UE may be configured to report a first report quantity for a first set of resources, and a second report quantity for a second set of resources, where the first set of resources and the second set of resources may be the same, or partially the same, or different. The UE may measure the first set of resources according to the first report quantity and measure the second set of resources according to the second report quantity. The UE may determine that the first report quantity results in a first payload size and determine that the second report quantity results in a second payload size. As such, the UE may adjust (e.g., by adding bits, removing bits, or rounding the measurement value) the first payload size, or the second payload size, or both such that the first and second payload sizes are the same. Upon adjusting the report quantity payload sizes, the UE may generate and transmit a measurement report including the first report quantity (e.g., a RSRP reporting quantity type) and the second report quantity (e.g., a SINR reporting quantity type), where the payload sizes associated with the first and second report quantities are the same.

Particular aspects of the subject matter described herein may be implemented to realize one or more advantages. The described techniques may support improvements in beam management procedures by decreasing signaling overhead and decreasing latency among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to techniques for reporting multiple quantity types.

FIG. 1 illustrates an example of a wireless communications system 100 that supports techniques for reporting multiple quantity types in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In a beam management procedure, a UE 115 may receive, from a base station 105, a configuration message indicating a first reporting quantity type (e.g., RSRP, SINR) and a second reporting quantity type (e.g., RSRP, SINR) for generating a measurement report. The first reporting quantity type and the second reporting quantity type may be different. The UE 115 may determine a measurement payload size to use for generating a measurement payload for the first reporting quantity type and the second reporting quantity type. The UE 115 may measure a first set of resources in accordance with the first reporting quantity type and a second set of resources in accordance with the second reporting quantity type. The first set of resources and the second set of resources may be the same or different. In some cases, the UE 115 may generate a first measurement payload having the measurement payload size based on measuring the first set of resources, and the UE may generate a second measurement payload having the measurement payload size based on measuring the second set of resources. The UE 115 may transmit, to the base station 105, the measurement report including the first measurement payload having the measurement payload size for the first reporting quantity type and the second measurement payload having the measurement payload size for the second reporting quantity type.

Figure 2:
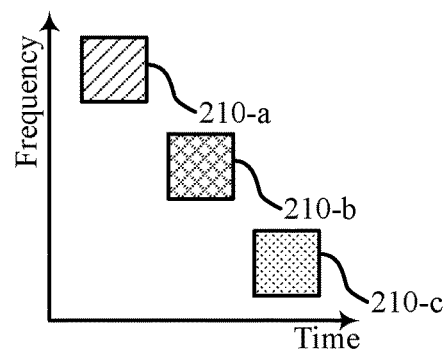
FIGS. 2 and 3 illustrate examples of wireless communications systems that support techniques for reporting multiple quantity types in accordance with aspects of the present disclosure.
Figure 2:
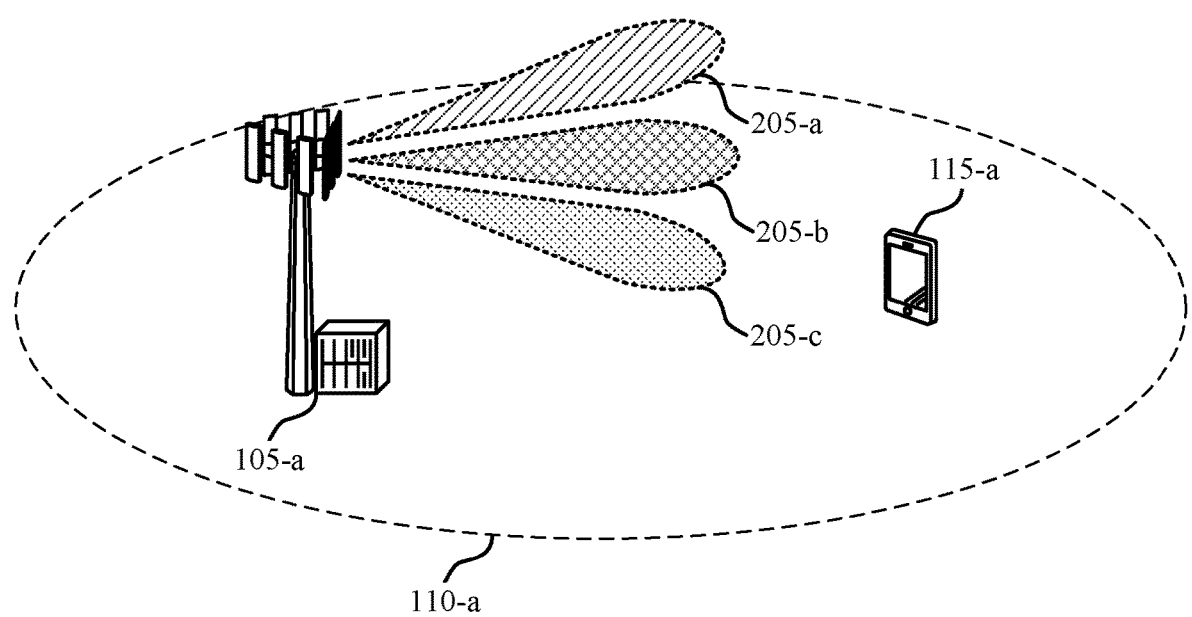

FIG. 2 illustrates an example of a wireless communications system 200 that supports techniques for reporting multiple quantity types in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may perform a beam management procedure with UE 115-a to configure and/or maintain reliable communications with UE 115-a. For example, base station 105-a may configure UE 115-a to measure and report multiple reporting quantities in a measurement report.

In some cases, the base station 105-a and the UE 115-a may support directional transmissions and may communicate via one or more directional beams. For example, the base station 105-a and the UE 115-a may communicate via downlink beams 205 or uplink beams, or both, and may perform directional transmissions using a directional beam. Further, the downlink beams 205 used by the base station 105-a and the UE 115-a may be associated with a resource set 210, such as time resources, frequency resources, a channel, medium, etc.

In some cases, the radio environment between base station 105-a and UE 115-a may change, which may affect the quality of the beam, the channel, or both, used by the base station 105-a and the UE 115-a. For example, the UE 115-a may move (e.g., change physical location) or an object may become present between the base station 105-a and the UE 115-a, which may affect the signal strength, signal quality, or both, of transmissions between base station 105-a and UE 115-a. Additionally, in some systems that support higher frequency communications, such as NR systems operating in frequency range 2 (FR2) radio frequency spectrum bands, a change in the radio environment between the base station 105-a and the UE 115-a may have a more pronounced influence on the quality of the beam or the channel. Further, in some systems supporting higher frequency communication, changes in the radio environment between the base station 105-*a* and the UE 115-*a* may result in sudden changes (e.g., small time-scale changes) in the quality of the beam or the channel used by the base station 105-*a* and the UE 115-*a*. In some cases, such changes in the radio environment between the base station 105-*a* and the UE 115-*a* may decrease the reliability of communications between base station 105-*a* and UE 115-*a* and, likewise, may decrease the likelihood of successful communication between the base station 105-*a* and the UE 115-*a*. Further, environmental changes affecting wireless signals transmitted between the UE 115-*a* and the base station 105-*a* may result in random constructive/destructive interference, multi-path propagation issues, fading, and the like. As an example, frequency selective fading may be characterized by various nulls or significant reduction in channel amplitude in a received signal across a set of resource elements. Thus, some resource elements, and some frequencies, may experience fading caused by external factors, such as reflections, interference, or the like.

To maintain reliable communications between the base station 105-*a* and the UE 115-*a*, the base station 105-*a* and the UE 115-*a* may perform one or more beam management procedures. As part of the beam management procedure, base station 105-*a* may transmit a configuration message (e.g., radio resource control (RRC) configuration message, RRC reconfiguration message) that may indicate a set of resources (e.g., time resources, frequency resources, downlink beams 205) for UE 115-*a* to measure, and a reporting quantity for UE 115-*a* to measure the set of resources in accordance with. In some cases, UE 115-*a* may be configured to measure beam management related signals (e.g., SSBs, CSI-RSs) that may be transmitted by base station 105-*a* over the set of resources. Base station 105-*a* may transmit one or more beam management signals such as CSI-RSs or SSBs via one or more beams (e.g., each signal may be transmitted by the base station 105-*a* using a different directional beam) over a current channel between the base station 105-*a* and the UE 115-*a*. Accordingly, the UE 115-*a* may measure a reporting quantity, such as RSRP (e.g., L1-RSRP) or SINR (e.g., L1-SINR), of the one or more signals associated with the channel.

For example, base station 105-*a* may transmit a configuration message, such as via RRC signaling, to UE 115-*a* that indicates a set of resources for UE 115-*a* to measure, and a reporting quantity to measure the set of resources in accordance with. Base station 105-*a* may indicate time and frequency resources, such as resource sets 210-*a*, 210-*b*, and 210-*c*, that UE 115-*a* should measure, where each resource set 210 may include any number of time and/or frequency resources. Each resource set 210 may be associated with a downlink beam 205 such that each downlink beam 205 is transmitted over a different resource set 210 so as to mitigate inference between neighboring downlink beams 205. For example, downlink beam 205-*a* may be associated with resource set 210-*a*, downlink beam 205-*b* may be associated with resource set 210-*b*, and downlink beam 205-*c* may be associated with resource set 210-*c*. Additionally or alternatively, base station 105-*a* may indicate one or more downlink beams 205 that UE 115-*a* may measure. Base station 105-*a* may also configure UE 115-*a* to measure beam management related signals (e.g., CSI-RSs or SSBs) transmitted over the downlink beams 205. UE 115-*a* may measure the signals received over the downlink beams 205 in accordance with the configured reporting quantity. For example, UE 115-*a* may measure RSRP or SINR of the received signals. UE 115-*a* may be configured to measure RSRP over downlink beams 205-*a*, 205-*b*, and 205-*c*. As such, UE 115-*a* may generate three measurements, one measurement associated with each downlink beam 205, and UE 115-*a* may report the measurements to base station 105-*a* that base station 105-*a* may use to determine a preferred downlink beam 205 to use for communicating with UE 115-*a* and/or to adjust configuration parameters between UE 115-*a* and base station 105-*a*.

In such cases where UE 115-*a* is configured to measure report quantities RSRP or SINR, and UE 115-*a* is configured to measure multiple resources, such as multiple beams, UE 115-*a* may be configured to transmit, in a single report, multiple different CSI-RS resource indicators (CRI) or SSB resource indicators (SSBRI), based on whether UE 115-*a* is configured to measure CSI-RSs, or SSBs. In some cases, the configuration of the CRI or SSBRI report may be configured by higher layer signaling (e.g., nrofReportedRS). In some cases, such as when UE 115-*a* receives nrofReportedRS, UE 115-*a* may be configured to transmit up to 4 measurements and/or 4 CRIs or SSBRIs. In some cases, the configuration may be based on one or more parameters being enabled. For example, when groupBasedBeamReporting is enabled, UE 115-*a* may be configured to transmit, at most, two different CRIs or SSBRIs for each report setting in a single reporting instance. In such cases, UE 115-*a* may report the largest measured value of the report quantity (e.g., L1-RSRP or L1-SINR) quantized to a bits (e.g., 7 bits) and each of the remaining reports as a b-bit (e.g., 4-bit) differential value relative to the largest report. As such, the total payload size associated with the report, where the number of beams to be measured is greater than 1 (e.g., N>1), is represented as $T=a+b\times(N-1)+N\times N_k$, where $N_k$ is equal to the length of the CRI or SSBRI (e.g., $\log 2(K_S^{CSI-RS})$, $\log 2(K_S^{SSB})$, where $K_S$ is the number of measurement resources).

In some cases, base station 105-*a* may configure UE 115-*a* to measure a first set of resources (e.g., $N_1$) according to a first reporting quantity (e.g., RSRP) and a second set of resources (e.g., $N_2$) according to a second reporting quantity (e.g., SINR), where the first set of resources and the second set of resources may be the same, partially the same, or different. In the case that the first and second set of resources are different, for example, UE 115-*a* may be configured to measure the RSRP of downlink beam 205-*a* via resource set 210-*a* and measure the SINR of downlink beams 205-*b* and 205-*c* via resource sets 210-*b*, and 210-*c*, respectively. In the case that the first and second resource sets 210 are the same, for example, UE 115-*a* may be configured to measure the RSRP of downlink beams 205-*a* and 205-*c*, and measure SINR of downlink beams 205-*a* and 205-*c*. In the case that the first and second set of resources are partially the same, UE 115-*a* may be configured to measure the RSRP of downlink beam 205-*a* and measure the SINR of downlink beams 205-*a*, 205-*b*, and 205-*c*. In some cases, the number of bits (e.g., a-bits and/or b-bits) associated with each reporting quantity may be different. As such, base station 105-*a* may need to transmit extra signaling to request multiple beam reports from UE 115-*a*, where each requested report may correspond to a different report quantity. As such, base station 105-*a* may configure and transmit multiple report configurations even though all report configurations may request that the same measurement resources (e.g., downlink beams 205, resource sets 210) are measured.

In some cases, to reduce signaling overhead, base station 105-*a* may configure a single measurement configuration that enables UE 115-*a* to report multiple report quantities of interest. In such cases, when mixed reporting quantities are enabled, UE 115-*a* and/or base station 105-*a* may determine the reporting quantity based on the beam selected to transmit the report (e.g., CRI). In some implementations, a message, such as in an RRC (re)configuration message, a single report setting may include multiple measurement resource settings and report quantities. For example, a single measurement configuration message may include multiple reporting quantities for UE 115-a to measure and/or multiple parameters associated with performing the measurements, such as the resources to measure, the report configuration type (e.g., periodic, semi-persistent, aperiodic), the report configuration identifier, carrier, etc. In some cases, the association between resource settings and reporting quantities may be implicitly mapped or explicitly signaled. For example, in the explicit case, the configuration message may directly indicate which resource settings (e.g., measurement resources) are associated with which reporting quantities. For example, in the implicit case, the configuration may order the report settings and/or the reporting quantities, where the ordering indicates a mapping that allows UE 115-a to determine the association between reporting settings and reporting quantities. In some cases, UE 115-a and/or base station 105-a may dynamically determine the reporting quantity to use for a resource or set of resources based on the operating conditions of UE 115-a and/or base station 105-a.

In cases of mixed reporting quantities, to reduce latency and signaling overhead, a single report may be configured to transmit multiple types of reporting quantities. For example, the single report may include a set of measurements of a set of resources in accordance with a first reporting quantity type, and a set of measurements of a set of resources in accordance with a second reporting quantity type, in the case of two different reporting quantity types, for example. However, because each reporting quantity may be associated with different payload sizes for transmitting the reporting quantity, the total payload size of a single measurement report may not align with existing formats. As such, to enable a single report to transmit multiple reporting quantities, the payload (e.g., physical uplink control channel (PUCCH) payload, or physical uplink shared channel (PUSCH) payload in the case of aperiodic reporting) may be aligned. For example, UE 115-a and/or base station 105-a may adjust the payloads of measurements associated with one or more reporting quantities included in a measurement report such that the payloads of each reporting quantity are the same. In some cases, the techniques described in the present disclosure may provide for mixed reporting quantities (e.g., multi-beam measurement and reporting enhancements) for L1/L2-centric inter-cell mobility and inter-cell multiple-TRP (mTRP) scenarios. Specifically, the present techniques may provide for L1/L2 mobility scenarios and mTRP CSI reporting where different resource sets may be associated with different TRPs.

In an example, aspects of the present disclosure may provide techniques for communicating a quality of up to K beams associated at least with non-serving cell(s), where the quality may be reported in a single CSI reporting instance. In some examples, the UE may report at least a measured reference signal indicator, a beam metric associated with the measured reference signal indicator, or both, for each beam (e.g., each beam in K beams) in support of L1/L2 mobility scenarios and mTRP CSI reporting for different TRPs. Additionally or alternatively, the UE may determine a maximum value of K, if K is fixed (e.g., configured, reported by a UE capability, dynamically selected, or a combination thereof). In some cases, techniques described in the present disclosure may also provide for determining a type of beam metric (e.g., L1-RSRP, L3-RSRP, or a hybrid L1/L3-RSRP) and related measurement behavior. For example, the UE 115-a may determine whether or not beam reporting associated with non-serving cell(s) may be mixed with that of a serving-cell in one reporting instance. For example, in reporting one instance, depending on the network configuration, beam(s) associated with a non-serving cell may be mixed with that associated with a serving cell. Based on whether or not beam reporting may be mixed with non-serving cells, the UE 115-a and/or the base station 105-a may adjust the payloads of measurements associated with one or more multi-beam measurements and include the measurements in the measurement report such that the payloads of each reporting quantity are the same.

Figure 3:
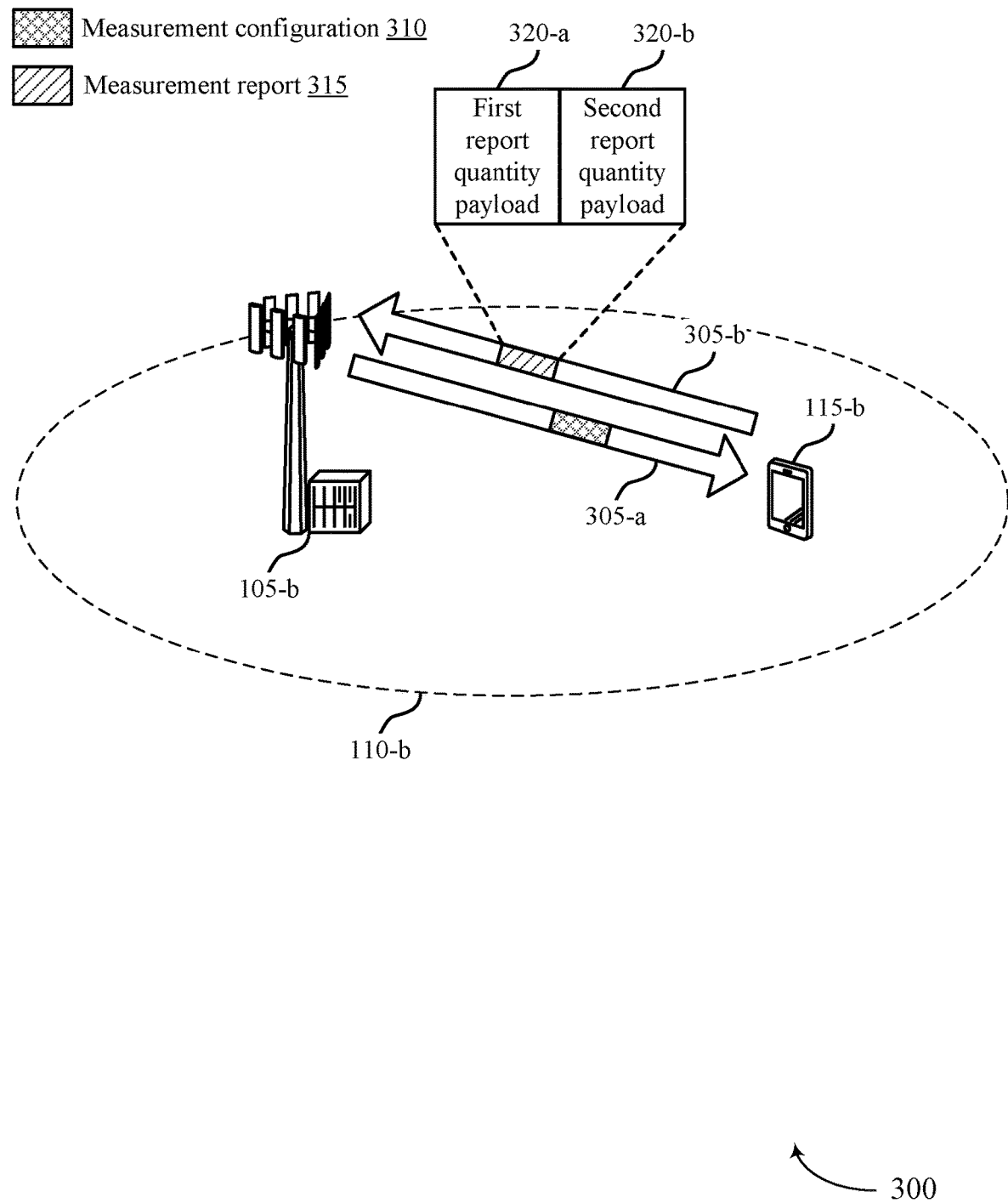

FIG. 3 illustrates an example of a wireless communications system 300 that supports techniques for reporting multiple quantity types in accordance with aspects of the present disclosure. The wireless communications system 300 may include base station 105-b and UE 115-b, which may be examples of a base station 105 and a UE 115 as described with reference to FIGS. 1 and 2. Base station 105-b may serve a geographic coverage area 110-b. In some cases, base station 105-b may perform a beam management procedure with UE 115-b to configure and/or maintain reliable communications with UE 115-b. For example, base station 105-b may configure UE 115-b to measure and report multiple reporting quantities in a measurement report.

In wireless communications system 300, base station 105-b may communicate with UE 115-b. In some cases, base station 105-b and UE 115-b may communicate via one or more transmission beams that allows base station 105-b and UE 115-b to communicate over communication links 305. For example, base station 105-b may transmit signals to UE 115-b via communication link 305-a (e.g., a downlink communication link) and UE 115-b may transmit signals to base station 105-b via communication link 305-b (e.g., an uplink communication link). In some cases, UE 115-b and base station 105-b may perform a beam management procedure to maintain a reliability associated with communication links 305, where the beam management procedure may include UE 115-b receiving one or more measurement configurations 310 from base station 105-b via communication link 305-a and include UE 115-b transmitting one or more measurement reports 315 to base station 105-b via communication link 305-b.

As described with reference to FIG. 2, a UE 115 (e.g., UE 115-b) may generate and transmit a single beam management related measurement report to a base station (e.g., base station 105-b) that includes multiple reporting quantity types. To configure the report to include multiple reporting quantity types, UE 115-b may adjust the payloads associated with one or more reporting quantity types such that each payload associated with a reporting quantity is the same. For example, UE 115-b may receive a measurement configuration 310 from base station 105-b that indicates UE 115-b may measure a first set of resources (e.g., time resources, frequency resources, or transmission beams, or a combination thereof) using a first reporting quantity (e.g., RSRP, L1-RSRP) and to measure a second set of resources (e.g., time resources, frequency resources, or transmission beams, or a combination thereof) using a second reporting quantity (e.g., SINR, L1-SINR), where the first set of resources and the second set of resources may be different, the same, or partially the same. In some cases, the measurement configuration 310 is included in an RRC message, such as an RRC configuration or RRC reconfiguration message. For example, in the case that the first and second set of resources are the same, UE 115-b may be configured to measure the SINR and the RSRP of the same set of transmission beams (e.g., downlink transmissions beams) by measuring signals (e.g., CSI-RS, SSBs) transmitted over the set of transmission beams.

UE 115-a may be configured to perform beam management related measurements and reporting aperiodically, semi-persistently, or periodically. In any of the configurations, UE 115-a may receive the measurement configuration 310 via RRC signaling, where the measurement configuration 310 may indicate the report type (e.g., aperiodic, semi-persistent, or periodic). In the case of periodic reporting, the measurement configuration 310 may indicate the periodicity at which UE 115-b may report a measurement report 315. In the case of aperiodic or semi-persistent reporting, UE 115-b may additionally receive an activation or trigger message that triggers UE 115-b to perform the aperiodic or semi-persistent reporting. For example, UE 115-b may receive, from base station 105-b, a MAC-CE activation message to trigger aperiodic or semi-persistent reporting, a downlink control information (DCI) trigger message to trigger semi-persistent reporting, or an aperiodic CSI-RS to trigger aperiodic reporting, or a combination thereof.

In response to receiving the measurement configuration 310, or an aperiodic or semi-persistent trigger, or both, UE 115-a may determine which resources to measure with which reporting quantity based on an implicit or explicit indication in the measurement configuration 310. UE 115-b may measure one or more signals received over the set of resources. For example, UE 115-a may measure one or more signals received over the first set of resource in accordance with the first reporting quantity and measure one or more signals received over the second set of resources in accordance with the second reporting quantity. Based on measuring, UE 115-b may generate payloads associated with the measurements. To generate the payloads, UE 115-b may identify a measurement payload size that each payload is to be aligned with and UE 115-b may adjust one or more of the payloads to match the measurement payload size.

In some cases, the base station 105-b may transmit control signaling to configure UE 115-b (e.g., in memory, or receive signaling that configures UE 115-b, such as periodic, aperiodic, or semi-persistent signaling) to determine the measurement payload size by determining which reporting quantity is associated with the largest payload size, where the measurement payload size may equal the size of the largest payload. UE 115-b may independently and/or dynamically determine which reporting quantity is associated with the largest payload, or UE 115-b may receive an indication, or be pre-configured with information regarding which reporting quantity is associated with the largest payload. For example, UE 115-b may be preconfigured with a list of reporting quantities, or reporting quantity payloads, or both that indicate a rank of the payloads by size. Based on the list, UE 115-b may identify which reporting quantities to be included in the measurement report 315 is associated with the largest payload. For example, UE 115-b may determine that the first reporting quantity (e.g., RSRP) is associated with the largest payload size, such as 10 bits, to transmit the first reporting quantity as compared to the payload associated with transmitting the second reporting quantity, such as 7 bits. Based on identifying which reporting quantity is associated with the largest payload size, UE 115-b may determine the number of bits included in the largest payload, such as 10 bits in this example. UE 115-b may determine that the measurement payload size may be equal to 10 bits. UE 115-b may adjust the payloads associated with any other reporting quantity, such as the second reporting quantity, to be included in the measurement report 315, to equal 10 bits. For example, UE 115-b may adjust the payloads associated with the second reporting quantity by adding bits, such a 0-bits (e.g., zero padding) to any measurement associated with the second reporting quantity. UE 115-b may not adjust the payloads of measurements associated with the first reporting quantity, as they each already equal 10 bits because the payload size associated with the first reporting quantity is being used as the measurement payload size. As such, any measurement made by UE 115-b that is associated with the first reporting quantity or the second reporting quantity that is to be included in the measurement report 315, has the same payload size, 10 bits.

In some cases, base station 105-b may transmit control signaling to configure the UE 115-b with a reference format of a number of bits to be used as the measurement payload size. In some cases, UE 115-b may be pre-configured with the reference format (e.g., in memory), where the number of bits in the reference format may be fixed or UE 115-b may receive the reference format via dynamic, semi-persistent, or aperiodic signaling from base station 105-b, where the number of bits in the reference format may change. In some cases, each time the number of bits in the reference format changes, base station 105-b may transmit the new reference format.

According to the reference format, such as a per-report reference format, UE 115-b may adjust one or more payloads to be included in the measurement report 315, to equal the payload size of the reference format. For example, the first reporting quantity may produce measurement payloads equal to 10 bits, and the second reporting quantity may procedure measurement payloads equal to 7 bits. In one example, the reference format may include 8 bits. As such, UE 115-b may adjust each payload associated with the first reporting quantity by subtracting (e.g., truncating) 2 bits (e.g., such as the last two bits) from each payload. Additionally or alternatively, UE 115-b may round each measurement associated with the first reporting quantity to a less precise value such that each measurement requires a fewer number of bits, such as 8 bits rather than 10 bits. UE 115-b may also adjust each payload associated with the second reporting quantity by adding 1 bit, such as a 0-bit (e.g., zero padding) to each payload so that each payload associated with the second reporting quantity includes 8 bits. As such, each per-report payload included in the measurement report 315 may be equal to 8 bits.

In some cases, the reference format may be a total payload reference format such that the reference format indicates the total payload size of the measurement report 315. In such cases, UE 115-b may identify the total payload size and determine a per-report payload size for each individual measurement payload, where each individual measurement payload size is the same. For example, UE 115-b may divide the number of bits in the total payload reference format based on the number of reporting quantities to be included in the measurement report 315, or based on the number of measurements (e.g., the number of resources UE 115-b is to measure for each reporting quantity), or both.

Based on aligning the payload sizes for each measurement to be included in the measurement report 315, UE 115-b may generate the measurement report 315. UE 115-b may configure the measurement report 315 to include a first report quantity payload 320-a and a second report quantity payload 320-b. The first report quantity payload 320-a may include each measurement made in accordance with the first reporting quantity on the first set of resources and the second report quantity payload 320-b may include each measurement made in accordance with the second reporting quantity on the second set of resources, where the payload associated with each measurement in the first reporting quantity payload 320-*b* and the second report quantity payload 320-*b* is the same.

In some cases, the techniques described in the present disclosure may provide for mixed reporting quantities (e.g., multi-beam measurement and reporting enhancements) for L1/L2-centric inter-cell mobility and inter-cell multiple-TRP (mTRP) scenarios. For example, the UE 115-*a* may determine whether or not beam reporting associated with non-serving cell(s) (e.g., first report quantity payload 320-*a*) can be mixed with that of a serving-cell in one reporting instance (e.g., second report quantity payload 320-*b*). For example, in reporting one instance, depending on the network configuration, beam(s) associated with a non-serving cell may be mixed with that associated with a serving cell. Based on whether or not beam reporting may be mixed with non-serving cells, the UE 115-*a* and/or the base station 105-*a* may adjust the payloads of measurements associated with one or more multi-beam measurements and include the measurements in the measurement report such that the payloads of each reporting quantity are the same.

Figure 4:
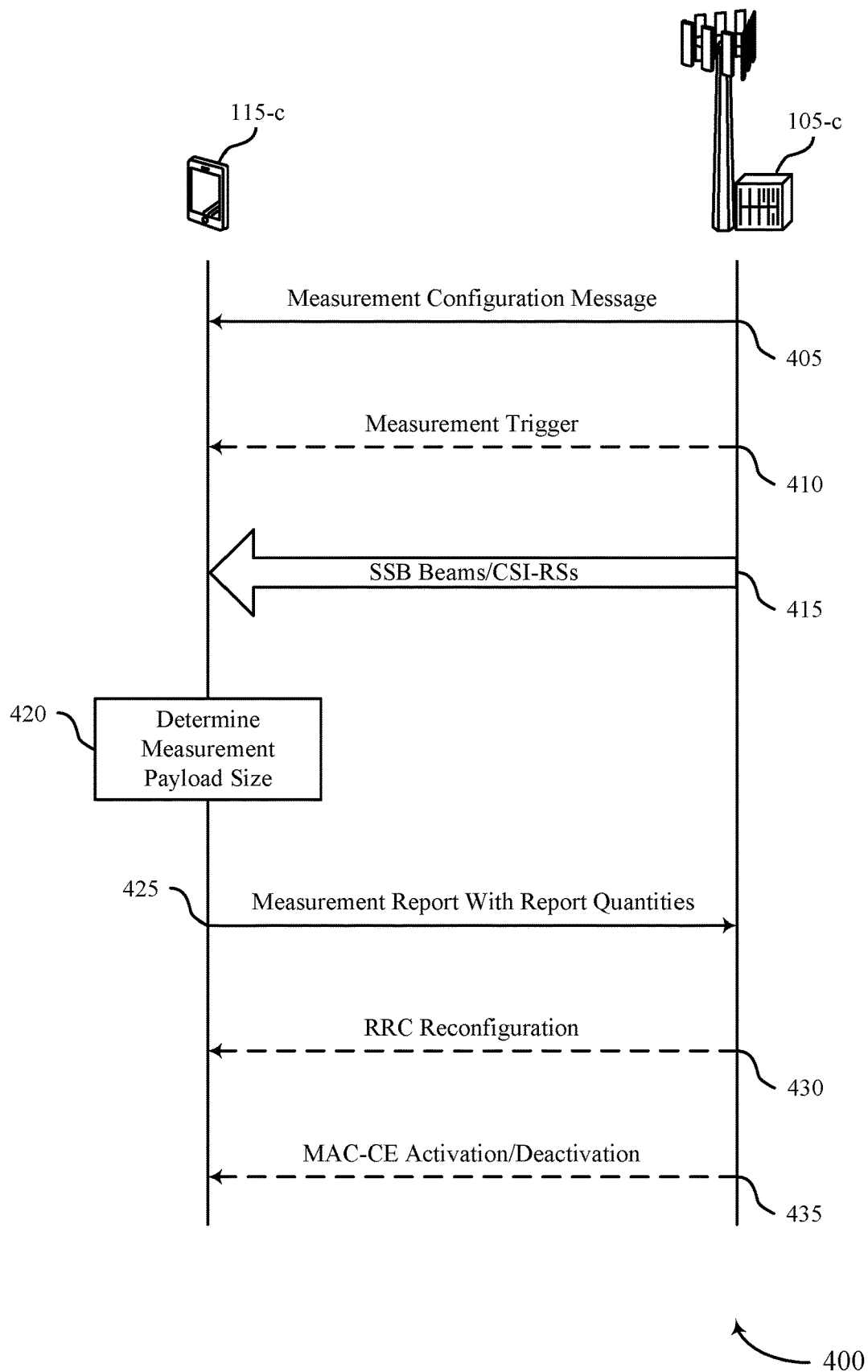
FIG. 4 illustrates an example of a process flow that supports techniques for reporting multiple quantity types in accordance with aspects of the present disclosure.

FIG. 4 illustrates an example of a process flow 400 that supports techniques for reporting multiple quantity types in accordance with aspects of the present disclosure. The process flow 400 may illustrate an example beam management procedure. For example, base station 105-*c* may perform a beam management procedure with UE 115-*c* to configure and/or maintain reliable communications with UE 115-*c*. Base station 105-*c* may configure UE 115-*c* to measure and report multiple reporting quantities in a measurement report. Base station 105-*c* and UE 115-*c* may be examples of the corresponding wireless devices described with reference to FIGS. 1-3. Alternative examples of the following may be implemented, where some steps are performed in a different order than described or are not performed at all. In some cases, steps may include additional features not mentioned below, or further steps may be added.

At 405, UE 115-*c* may receive, from base station 105-*c*, a measurement configuration message (e.g., an RRC reconfiguration message, an RRC configuration message), where the measurement configuration may indicate one or more parameters associated with UE 115-*c* performing a beam management procedure. For example, UE 115-*c* may receive, from base station 105-*b*, a configuration message indicating a first reporting quantity type and a second reporting quantity type for generating a measurement report. In some cases, some report setting included in the measurement configuration message may indicate that UE 115-*c* is to report multiple reports, such as reports each associated with a different reporting quantity, per a single reporting instance. The first reporting quantity type and the second reporting quantity type are one of an L1-RSRP measurement, or L1-SINR measurement, where the first reporting quantity type and the second reporting quantity type may be different.

In some implementations, UE 115-*c* may receive the configuration message that indicates to use, as the measurement payload size, a larger of a first payload size associated with the first reporting quantity type and a second payload size associated with the second reporting quantity type. In some implementations, UE 115-*c* may receive the configuration message that indicates the measurement payload size, where the measurement payload size may be determined by UE 115-*c* based on the configuration message. In some implementations, UE 115-*c* may receive the configuration message including an indication of a first subset of measurement resources of a set of measurement resources on which to report in accordance with the first reporting quantity type and a second subset of measurement resources of the set of measurement resources on which to report in accordance with the second reporting quantity type, such that the resources measured in accordance with each reporting quantity type are partially the same or different. In some implementations, UE 115-*c* may receive the configuration message including an indication of a set of measurement resources on which to report in accordance with the first reporting quantity type and the second reporting quantity type, such that the resources measured in accordance with each reporting quantity are the same. In some cases, the configuration message may include an indication of a set of measurement resources that correspond to a plurality of transmission beams (e.g., downlink transmission beams).

In some cases, UE 115-*c* may receive control signaling that indicates the measurement payload size. In some cases, UE 115-*c* may receive the control signaling as an RRC message, a MAC-CE message, or a DCI message. In some implementations, UE 115-*c* may receive the configuration message that indicates to use a reference measurement payload size as the measurement payload size.

In some cases, such as the cases when UE 115-*c* is configured to perform aperiodic or semi-persistent reporting, at 410, UE 115-*c* may receive, from base station 105-*c*, a measurement trigger that may trigger UE 115-*c* to perform the aperiodic or semi-persistent reporting. In some cases, the measurement trigger may be a MAC-CE activation message, a DCI trigger message for semi-persistent reporting, an aperiodic CSI-RS, or a combination thereof.

At 415, base station 105-*c* may transmit beam related signals (e.g., SSB beams/CSI-RS) over a set of beams, such as in a beam sweeping manner, based on the measurement configuration message. For example, base station 105-*b* may transmit SSB beams for UE 115-*c* to perform measurements on, or transmit CSI-RSs over the set of beams from UE 115-*c* to measure. UE 115-*c* may receive and measure the beam related signals over the set of beams in accordance with parameters defined in the measurement configuration message. For example, UE 115-*c* may measure a first set of resources in accordance with the first reporting quantity type, and measure a second set of resources in accordance with the second reporting quantity type.

UE 115-*c* may measure at least a subset of a set of measurement resources in accordance with the first reporting quantity type, and measure at least a subset of a set of measurement resources in accordance with the second reporting quantity type, where the set of measurement resources and/or the subset of the set of measurement resources are indicated in the measurement configuration message, or some other message from base station 105-*c*.

At 420, UE 115-*c* may determine a measurement payload size to use for generating a measurement payload for the first reporting quantity type and second reporting quantity type. In some cases, UE 115-*c* may determine the measurement payload size based on a larger of a first payload size associated with the first reporting quantity type and a second payload size associated with the second reporting quantity type. UE 115-*c* may generate the second measurement payload by adding one or more bits to a payload of the second reporting quantity type based on the first payload size being larger than the second payload size.

In some cases, such as when UE 115-*c* receives a reference measurement payload size, UE 115-*c* may determine the measurement payload size that is a reference measurement payload size for UE 115-*c* to use when generating a measurement payload associated with each of the first and second reporting quantity types. UE 115-c may generate the first measurement payload by adding one or more bits to a payload of the first reporting quantity type to generate the first measurement payload having the reference measurement payload size based on a payload size of the payload of the first reporting quantity type being less than the reference measurement payload size. UE 115-c may generate the first measurement payload by removing one or more bits from a payload of the first reporting quantity type to generate the first measurement payload having the reference measurement payload size based on a payload size of the first reporting quantity type being greater than the reference measurement payload size. UE 115-c may generate the first measurement payload by rounding a payload of the first reporting quantity type to generate the first measurement payload. The first measurement payload may have the reference measurement payload size based on a payload size of the payload of the first reporting quantity type being greater than the reference measurement payload size.

In some cases, to determine the measurement payload size, UE 115-c may retrieve the measurement payload size from a memory of UE 115-c. In some cases, UE 115-c may determine a total payload size or a per-report payload size to use for generating the first measurement payload and the second measurement payload, and UE 115-c may determine the measurement payload size for each of the first reporting quantity type and the second reporting quantity type based on the total payload size or the per-report payload size. In some cases, UE 115-c may retrieve the total payload size or the per-report payload size from a memory of UE 115-c. The UE 115-c is preconfigured in memory or receives signaling from the base station with a fixed payload size that is a per-report payload size, a total payload size, or both. In some cases, UE 115-c may receive control signaling indicating the total payload size or the per-report payload size.

At 425, UE 115-c may transmit, to base station 105-c, a measurement report with the report quantities based on the measurement configuration message. For example, UE 115-c may transmit, to base station 105-c, the measurement report that may include a first measurement payload having the measurement payload size for the first reporting quantity type and a second measurement payload having the measurement payload size for the second reporting quantity type.

Optionally, at 430, UE 115-c may receive, from base station 105-c, an RRC reconfiguration message that may adjust one or more parameters associated with the RRC configuration based on the measurement report. In some implementations, UE 115-c may receive an RRC reconfiguration message based on the measurement report including the first measurement payload and the second measurement payload. Optionally, at 435, UE 115-c may receive, from base station 105-c, a MAC-CE activation or MAC-CE deactivation message, for example, in the case that UE 115-c received a MAC-CE activation message at 410.

Figure 5:
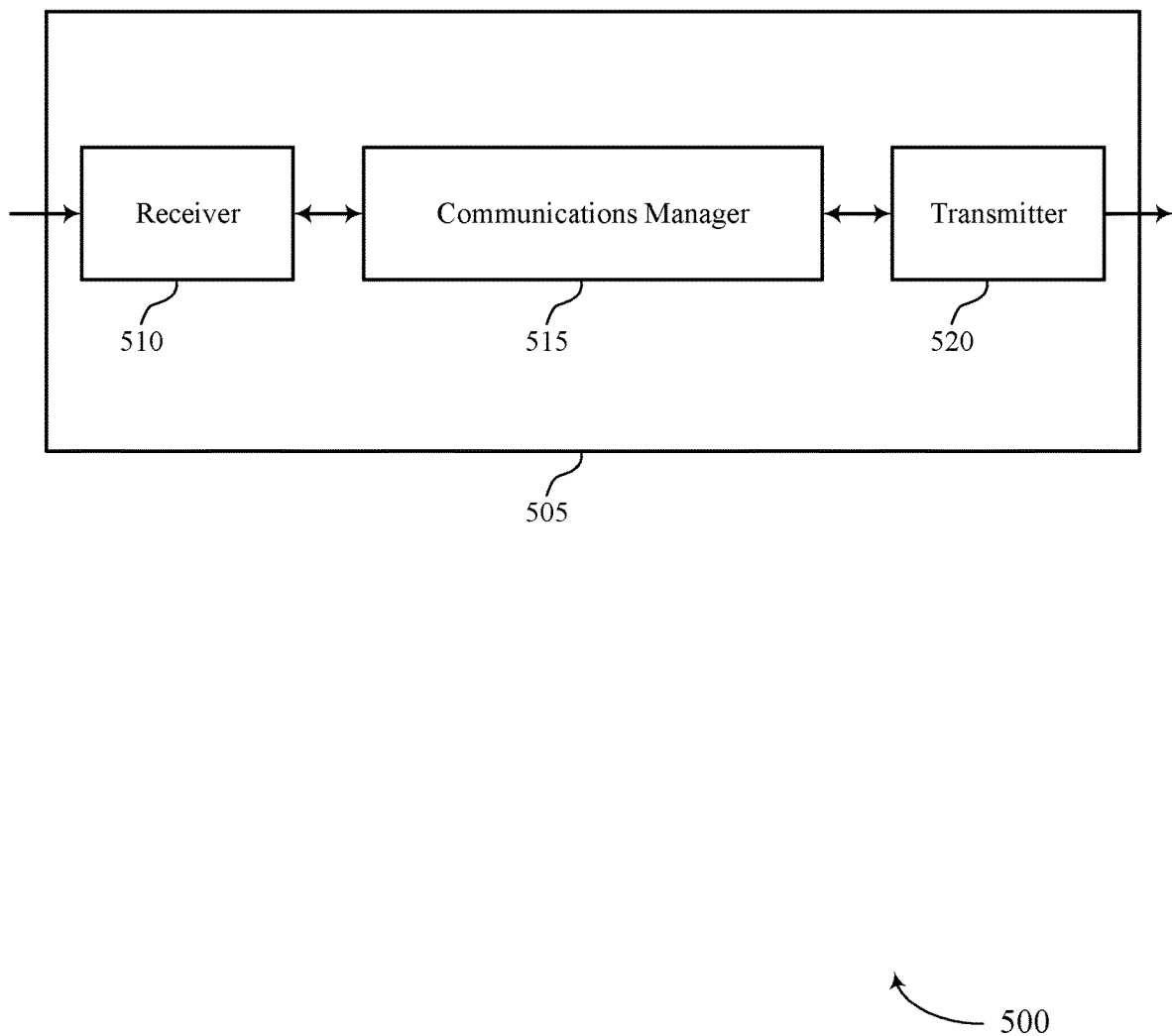
FIGS. 5 and 6 show block diagrams of devices that support techniques for reporting multiple quantity types in accordance with aspects of the present disclosure.

FIG. 5 shows a block diagram 500 of a device 505 that supports techniques for reporting multiple quantity types in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for reporting multiple quantity types, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a configuration message indicating a first reporting quantity type and a second reporting quantity type for generating a measurement report, determine a measurement payload size to use for generating a measurement payload for the first reporting quantity type and second reporting quantity type, and transmit, to the base station, the measurement report including a first measurement payload having the measurement payload size for the first reporting quantity type and a second measurement payload having the measurement payload size for the second reporting quantity type. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more efficiently report beam management related measurements. For example, a device 505 may measure and report multiple types of reporting quantities within a single measurement report by aligning payloads within the report rather than configuring and transmitting multiple reports each associated with a different type of reporting quantity.

Based on implementing the payload aligning techniques as described herein, a processor of a UE 115 (e.g., controlling the receiver 510, the transmitter 520, or the transceiver 820 as described with reference to FIG. 8) may increase reliability, decrease latency, and decrease overhead related to a beam management procedure performed between a base station 105 and a UE 115.

Figure 6:
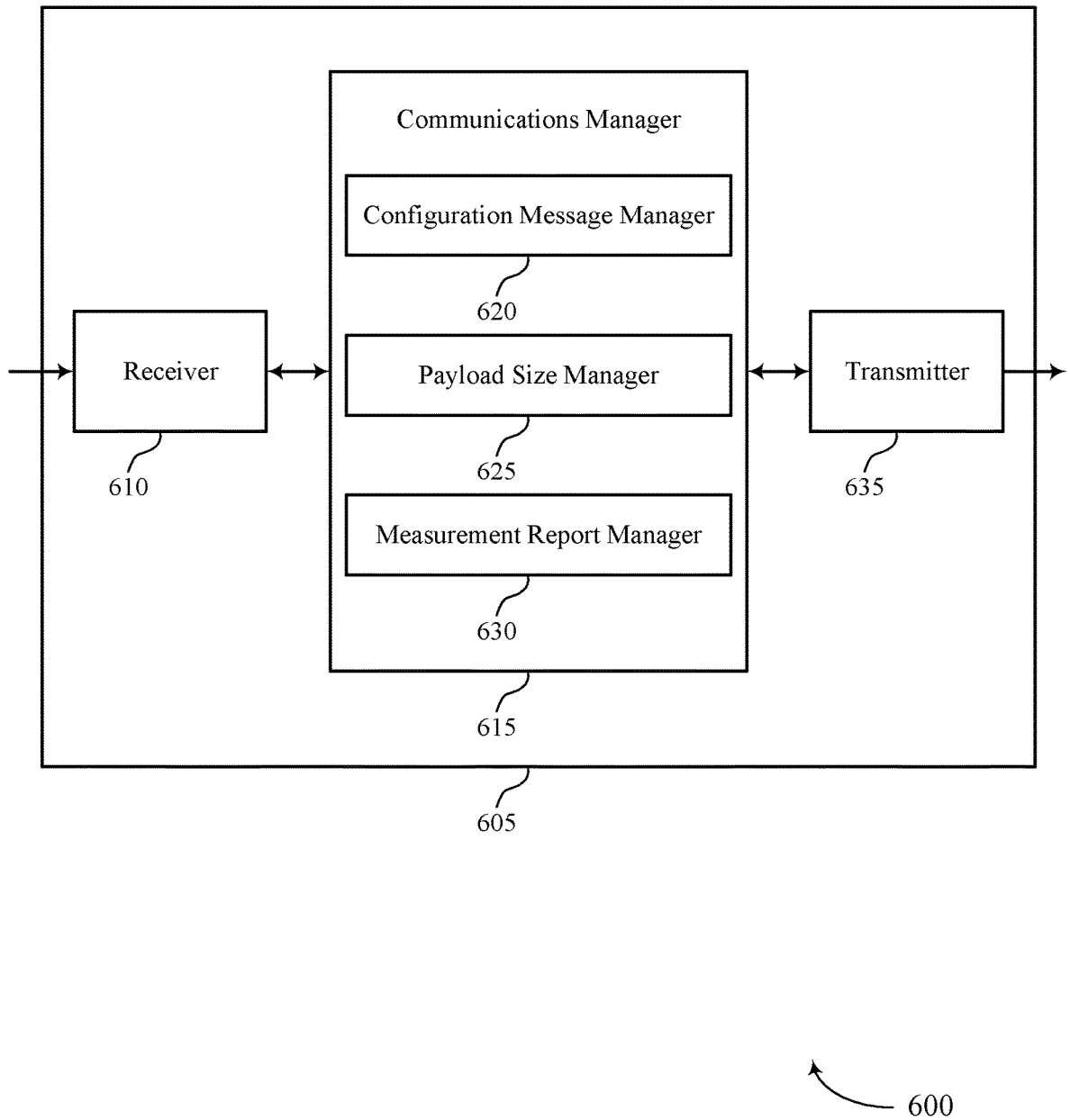

FIG. 6 shows a block diagram 600 of a device 605 that supports techniques for reporting multiple quantity types in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques for reporting multiple quantity types, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration message manager 620, a payload size manager 625, and a measurement report manager 630. The communications manager 615 may be an example of aspects of the communications manager 810 described herein.

The configuration message manager 620 may receive, from a base station, a configuration message indicating a first reporting quantity type and a second reporting quantity type for generating a measurement report. The payload size manager 625 may determine a measurement payload size to use for generating a measurement payload for the first reporting quantity type and second reporting quantity type. The measurement report manager 630 may transmit, to the base station, the measurement report including a first measurement payload having the measurement payload size for the first reporting quantity type and a second measurement payload having the measurement payload size for the second reporting quantity type.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
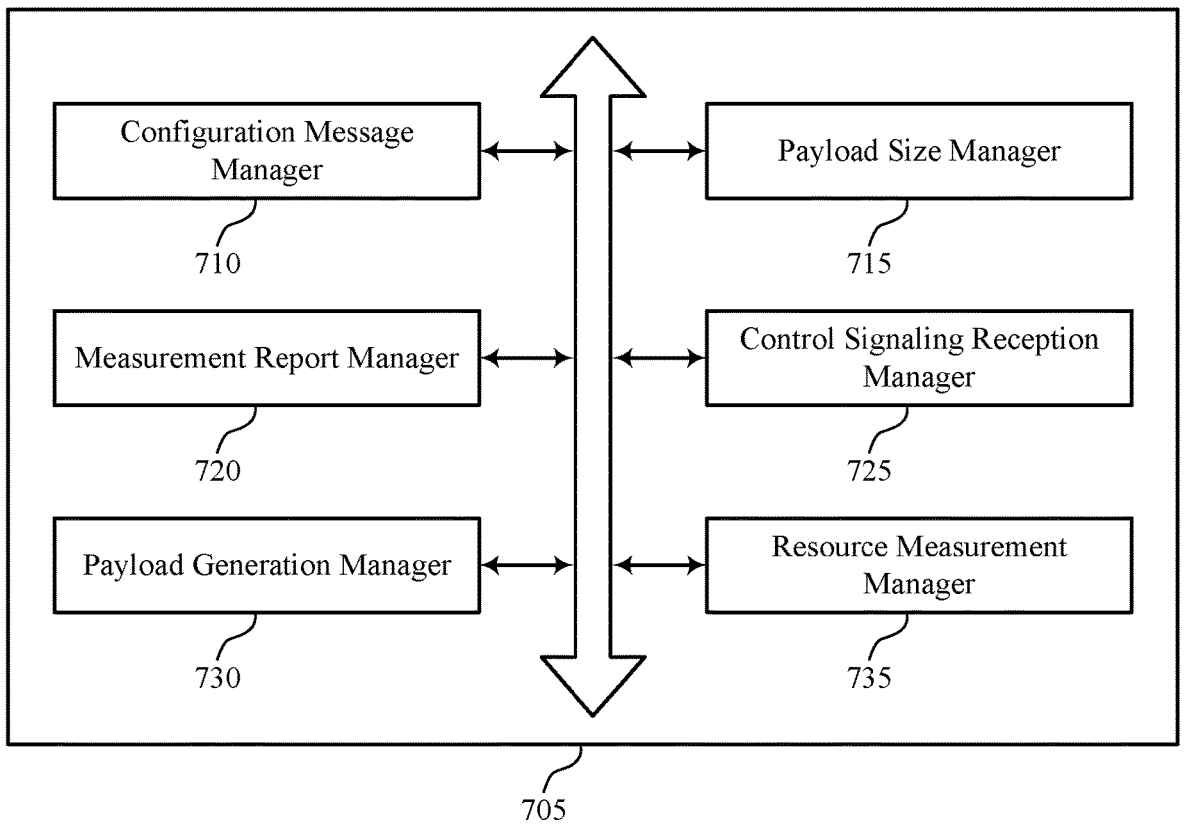
FIG. 7 shows a block diagram of a communications manager that supports techniques for reporting multiple quantity types in accordance with aspects of the present disclosure.

FIG. 7 shows a block diagram 700 of a communications manager 705 that supports techniques for reporting multiple quantity types in accordance with aspects of the present disclosure. The communications manager 705 may be an example of aspects of a communications manager 515, a communications manager 615, or a communications manager 810 described herein. The communications manager 705 may include a configuration message manager 710, a payload size manager 715, a measurement report manager 720, a control signaling reception manager 725, a payload generation manager 730, and a resource measurement manager 735. Each of these modules may communicate, directly or indirectly, with one another (e.g., via one or more buses).

The configuration message manager 710 may receive, from a base station, a configuration message indicating a first reporting quantity type and a second reporting quantity type for generating a measurement report. The payload size manager 715 may determine a measurement payload size to use for generating a measurement payload for the first reporting quantity type and second reporting quantity type. The measurement report manager 720 may transmit, to the base station, the measurement report including a first measurement payload having the measurement payload size for the first reporting quantity type and a second measurement payload having the measurement payload size for the second reporting quantity type.

In some examples, the configuration message manager 710 may receive the configuration message that indicates to use, as the measurement payload size, a larger of a first payload size associated with the first reporting quantity type and a second payload size associated with the second reporting quantity type. In some examples, the configuration message manager 710 may receive the configuration message that indicates the measurement payload size, where the measurement payload size is determined based on the configuration message. In some examples, the configuration message manager 710 may receive the configuration message including an indication of a first subset of measurement resources of a set of measurement resources on which to report in accordance with the first reporting quantity type and a second subset of measurement resources of the set of measurement resources on which to report in accordance with the second reporting quantity type. In some examples, the configuration message manager 710 may receive the configuration message including an indication of a set of measurement resources on which to report in accordance with the first reporting quantity type and the second reporting quantity type.

The control signaling reception manager 725 may receive control signaling indicating the measurement payload size. In some examples, the control signaling reception manager 725 may receive the control signaling that is a radio resource control message, a medium access control element message, or a downlink control information message.

In some examples, the configuration message manager 710 may receive, from the base station, a radio resource control reconfiguration message based on the measurement report including the first measurement payload and the second measurement payload.

In some examples, the payload size manager 715 may determine the measurement payload size based on a larger of a first payload size associated with the first reporting quantity type and a second payload size associated with the second reporting quantity type. In some examples, the payload size manager 715 may generate the second measurement payload by adding one or more bits to a payload of the second reporting quantity type based on the first payload size being larger than the second payload size.

In some examples, the configuration message manager 710 may receive the configuration message that indicates to use a reference measurement payload size as the measurement payload size. In some examples, the payload size manager 715 may determine the measurement payload size that is a reference measurement payload size for the UE to use when generating a measurement payload associated with each of the first and second reporting quantity types. In some examples, the payload size manager 715 may retrieve the measurement payload size from a memory of the UE.

The payload generation manager 730 may generate the first measurement payload by adding one or more bits to a payload of the first reporting quantity type to generate the first measurement payload having the reference measurement payload size based on a payload size of the payload of the first reporting quantity type being less than the reference measurement payload size. In some examples, the payload generation manager 730 may generate the first measurement payload by removing one or more bits from a payload of the first reporting quantity type to generate the first measurement payload having the reference measurement payload size based on a payload size of the payload of the first reporting quantity type being greater than the reference measurement payload size. In some examples, the payload generation manager 730 may generate the first measurement payload by rounding a payload of the first reporting quantity type to generate the first measurement payload having the reference measurement payload size based on a payload size of the payload of the first reporting quantity type being greater than the reference measurement payload size.

In some examples, the payload size manager 715 may determine a total payload size or a per-report payload size to use for generating the first measurement payload and the second measurement payload. In some examples, the payload size manager 715 may determine the measurement payload size for each of the first reporting quantity type and the second reporting quantity type based on the total payload size or the per-report payload size. In some examples, the payload size manager 715 may retrieve the total payload size or the per-report payload size from a memory of the UE. In some examples, the control signaling reception manager 725 may receive control signaling indicating the total payload size or the per-report payload size.

In some cases, the first reporting quantity type and the second reporting quantity type are one of a layer 1 reference signal received power measurement, or a layer 1 signal-to-interference-plus-noise ratio measurement, where the first reporting quantity type and the second reporting quantity type are different.

In some examples, the configuration message manager 710 may receive the configuration message including an indication of a set of measurement resources that correspond to a set of transmission beams.

The resource measurement manager 735 may measure at least a subset of a set of measurement resources in accordance with the first reporting quantity type. In some examples, the resource measurement manager 735 may measure at least a subset of a set of measurement resources in accordance with the second reporting quantity type.

Figure 8:
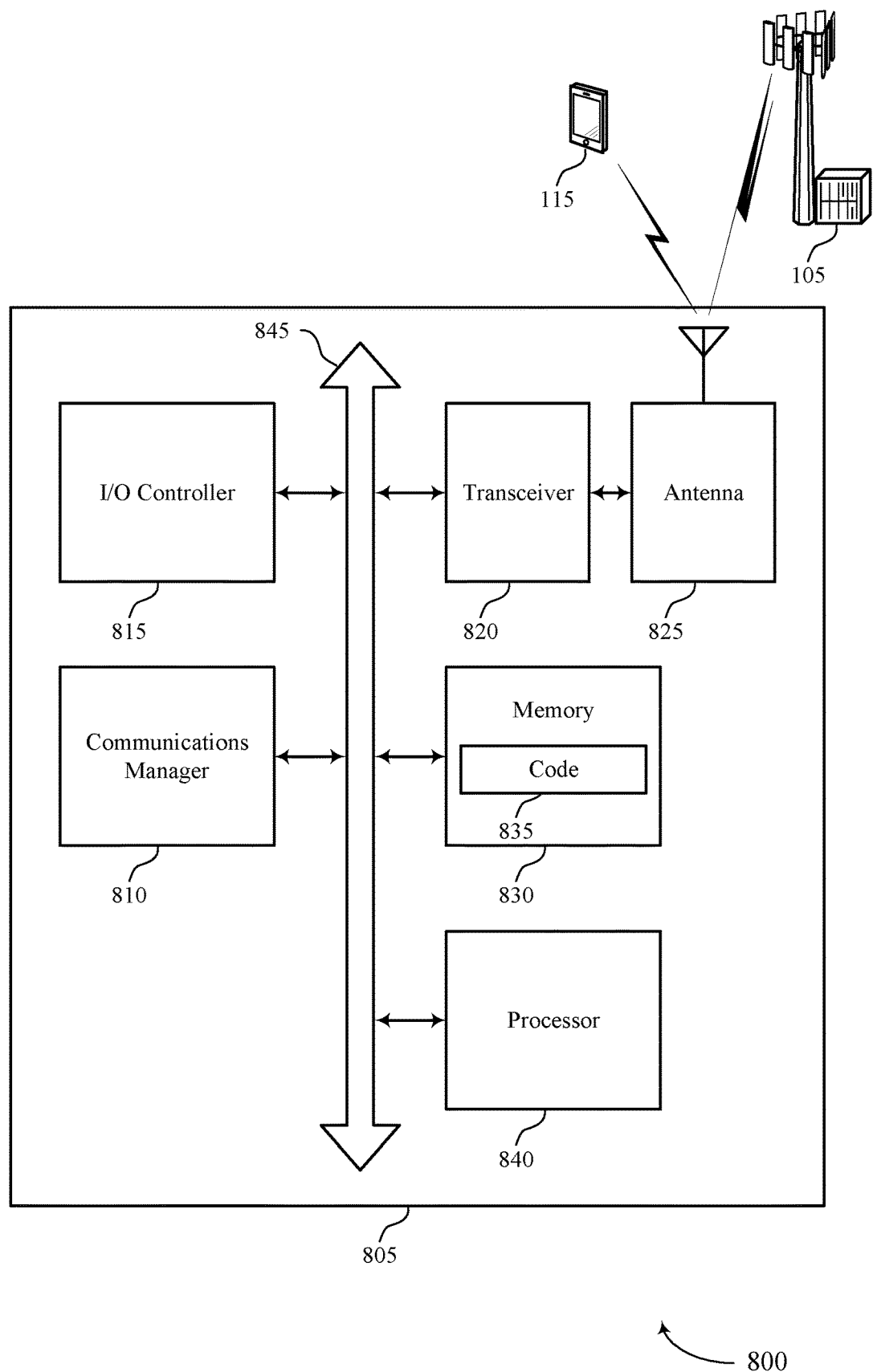
FIG. 8 shows a diagram of a system including a device that supports techniques for reporting multiple quantity types in accordance with aspects of the present disclosure.

FIG. 8 shows a diagram of a system 800 including a device 805 that supports techniques for reporting multiple quantity types in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a configuration message indicating a first reporting quantity type and a second reporting quantity type for generating a measurement report, determine a measurement payload size to use for generating a measurement payload for the first reporting quantity type and second reporting quantity type, and transmit, to the base station, the measurement report including a first measurement payload having the measurement payload size for the first reporting quantity type and a second measurement payload having the measurement payload size for the second reporting quantity type.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for reporting multiple quantity types).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
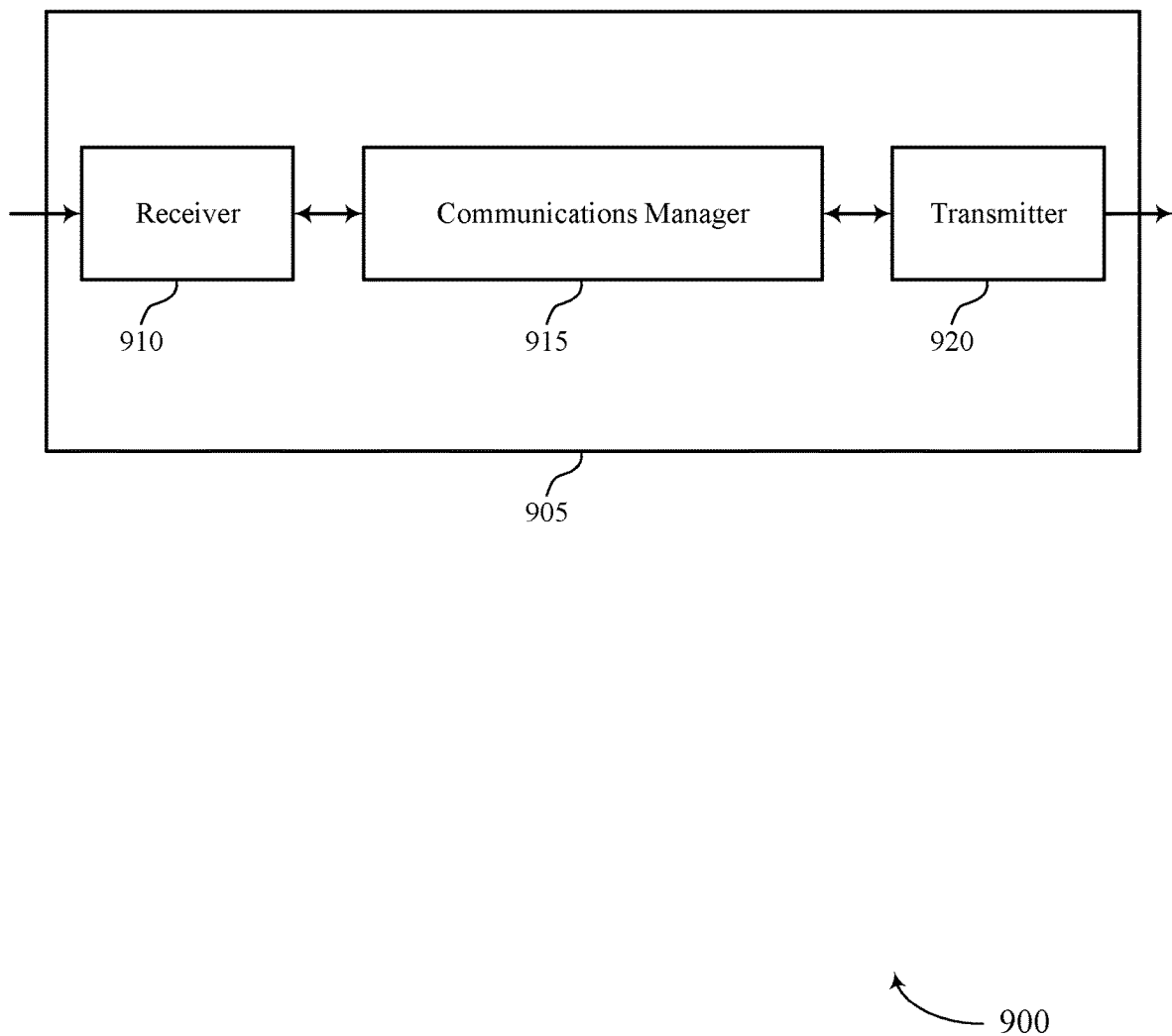
FIGS. 9 and 10 show block diagrams of devices that support techniques for reporting multiple quantity types in accordance with aspects of the present disclosure.

FIG. 9 shows a block diagram 900 of a device 905 that supports techniques for reporting multiple quantity types in accordance with aspects of the present disclosure. The device 905 may be an example of aspects of a base station 105 as described herein. The device 905 may include a receiver 910, a communications manager 915, and a transmitter 920. The device 905 may also include a processor.

Each of these components may be in communication with one another (e.g., via one or more buses).

The receiver 910 may receive information such as packets, user data, or control information associated with various information channels (e.g., control channels, data channels, and information related to techniques for reporting multiple quantity types, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration message indicating a first reporting quantity type and a second reporting quantity type for generating a measurement report and receive, from the UE, the measurement report including a first measurement payload having a measurement payload size for the first reporting quantity type and a second measurement payload having the measurement payload size for the second reporting quantity type. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
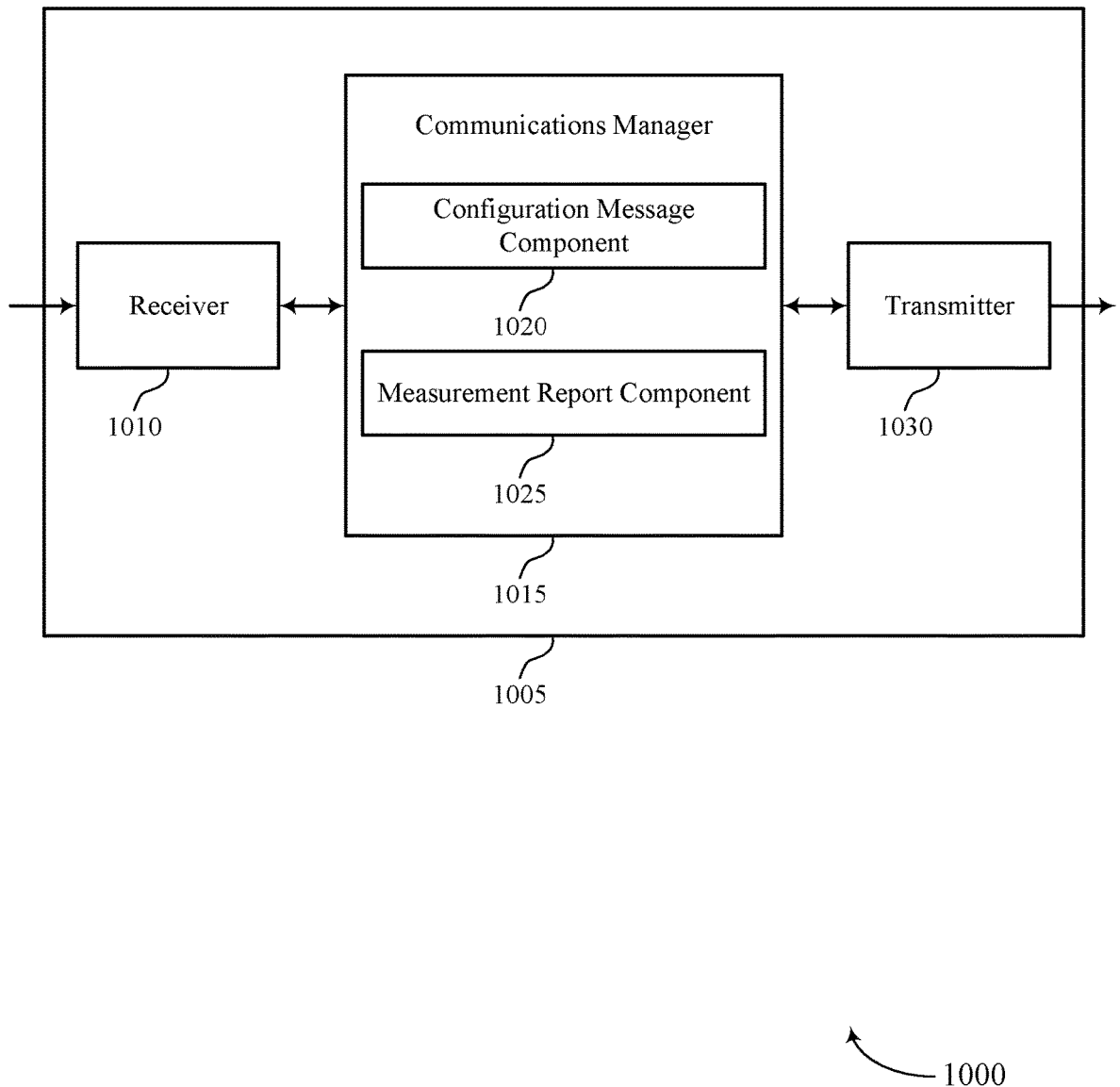

FIG. 10 shows a block diagram 1000 of a device 1005 that supports techniques for reporting multiple quantity types in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for reporting multiple quantity types, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration message component 1020 and a measurement report component 1025. The communications manager 1015 may be an example of aspects of the communications manager 1210 described herein.

The configuration message component 1020 may transmit, to a UE, a configuration message indicating a first reporting quantity type and a second reporting quantity type for generating a measurement report. The measurement report component 1025 may receive, from the UE, the measurement report including a first measurement payload having a measurement payload size for the first reporting quantity type and a second measurement payload having the measurement payload size for the second reporting quantity type.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
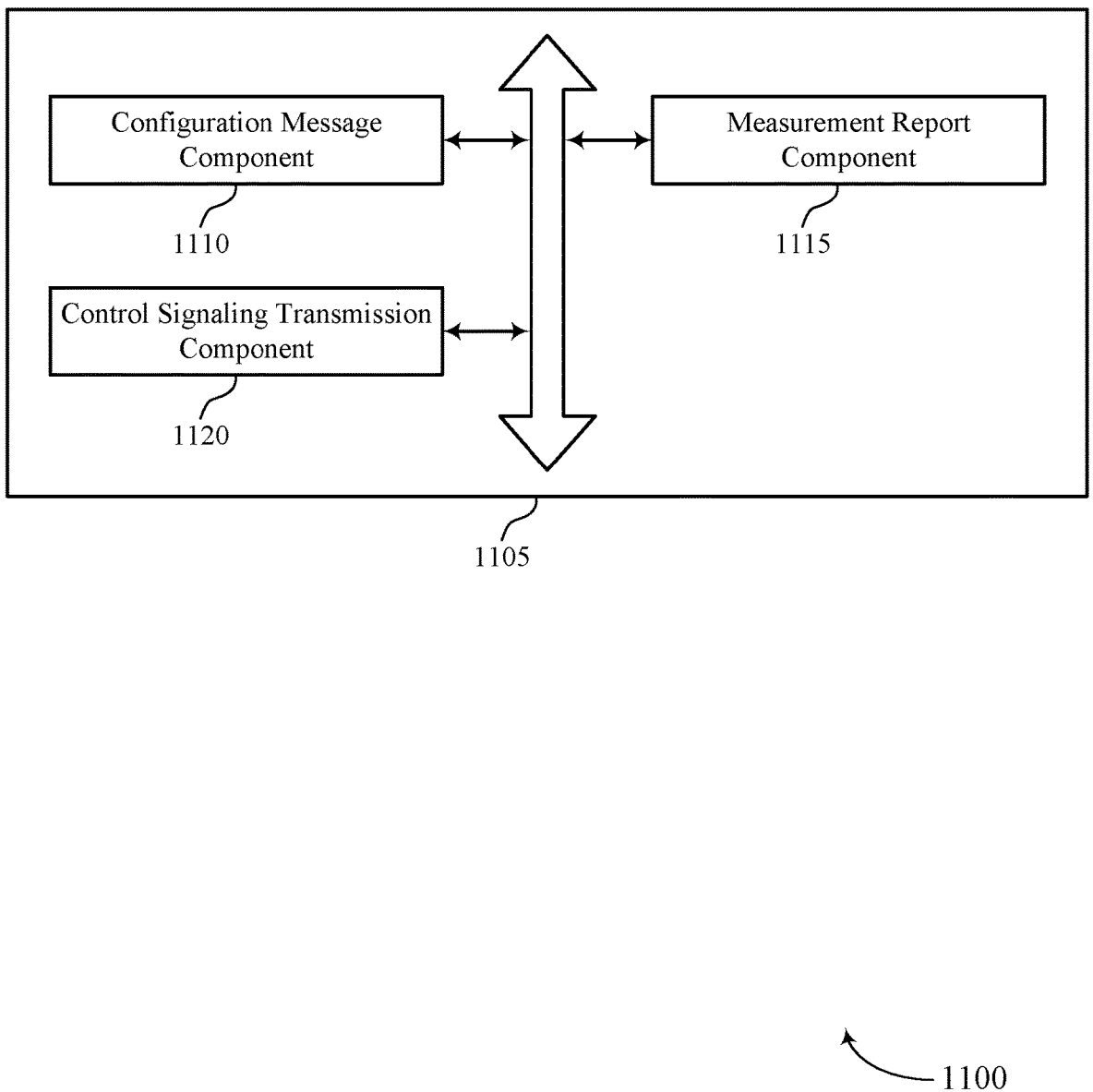
FIG. 11 shows a block diagram of a communications manager that supports techniques for reporting multiple quantity types in accordance with aspects of the present disclosure.

FIG. 11 shows a block diagram 1100 of a communications manager 1105 that supports techniques for reporting multiple quantity types in accordance with aspects of the present disclosure. The communications manager 1105 may be an example of aspects of a communications manager 915, a communications manager 1015, or a communications manager 1210 described herein. The communications manager 1105 may include a configuration message component 1110, a measurement report component 1115, and a control signaling transmission component 1120. Each of these modules may communicate, directly or indirectly, with one another (e.g., via one or more buses).

The configuration message component 1110 may transmit, to a UE, a configuration message indicating a first reporting quantity type and a second reporting quantity type for generating a measurement report. The measurement report component 1115 may receive, from the UE, the measurement report including a first measurement payload having a measurement payload size for the first reporting quantity type and a second measurement payload having the measurement payload size for the second reporting quantity type.

In some examples, the configuration message component 1110 may transmit the configuration message including an indication of a first subset of measurement resources of a set of measurement resources on which to report in accordance with the first reporting quantity type and a second subset of measurement resources of the set of measurement resources on which to report in accordance with the second reporting quantity type. In some examples, the configuration message component 1110 may transmit the configuration message including an indication of a set of measurement resources on which to report in accordance with the first reporting quantity type and the second reporting quantity type. In some examples, the configuration message component 1110 may transmit, to the UE, a radio resource control reconfiguration message based on the measurement report including the first measurement payload and the second measurement payload.

The control signaling transmission component 1120 may transmit control signaling indicating the measurement payload size. In some examples, the control signaling transmission component 1120 may transmit the control signaling that is a radio resource control message, a medium access control element message, or a downlink control information message.

In some examples, the configuration message component 1110 may transmit the configuration message that indicates the measurement payload size. In some examples, the configuration message component 1110 may transmit the configuration message that indicates to use, as the measurement payload size, a larger of a first payload size associated with the first reporting quantity type and a second payload size associated with the second reporting quantity type.

In some examples, the configuration message component 1110 may transmit the configuration message that indicates to use a reference measurement payload size as the measurement payload size. In some examples, the configuration message component 1110 may transmit control signaling indicating a total payload size or a per-report payload size, where the measurement payload size is determined based on the control signaling. In some examples, the configuration message component 1110 may transmit the configuration message including an indication of a set of measurement resources that correspond to a set of transmission beams.

In some cases, the first reporting quantity type and the second reporting quantity type are one of a layer 1 reference signal received power measurement, or a layer 1 signal-to-interference-plus-noise ratio measurement, where the first reporting quantity type and the second reporting quantity type are different.

Figure 12:
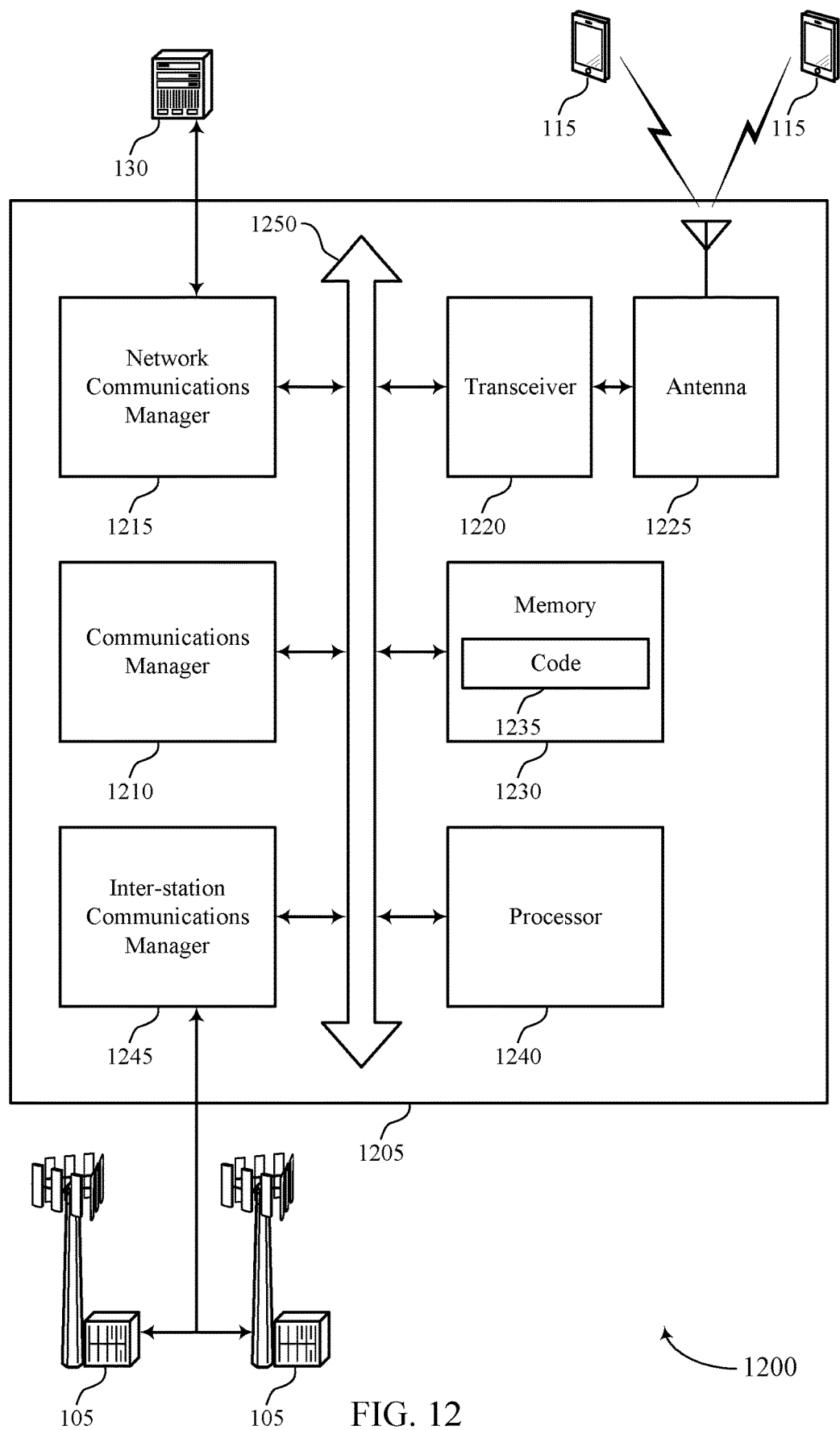
FIG. 12 shows a diagram of a system including a device that supports techniques for reporting multiple quantity types in accordance with aspects of the present disclosure.

FIG. 12 shows a diagram of a system 1200 including a device 1205 that supports techniques for reporting multiple quantity types in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration message indicating a first reporting quantity type and a second reporting quantity type for generating a measurement report and receive, from the UE, the measurement report including a first measurement payload having a measurement payload size for the first reporting quantity type and a second measurement payload having the measurement payload size for the second reporting quantity type.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for reporting multiple quantity types).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
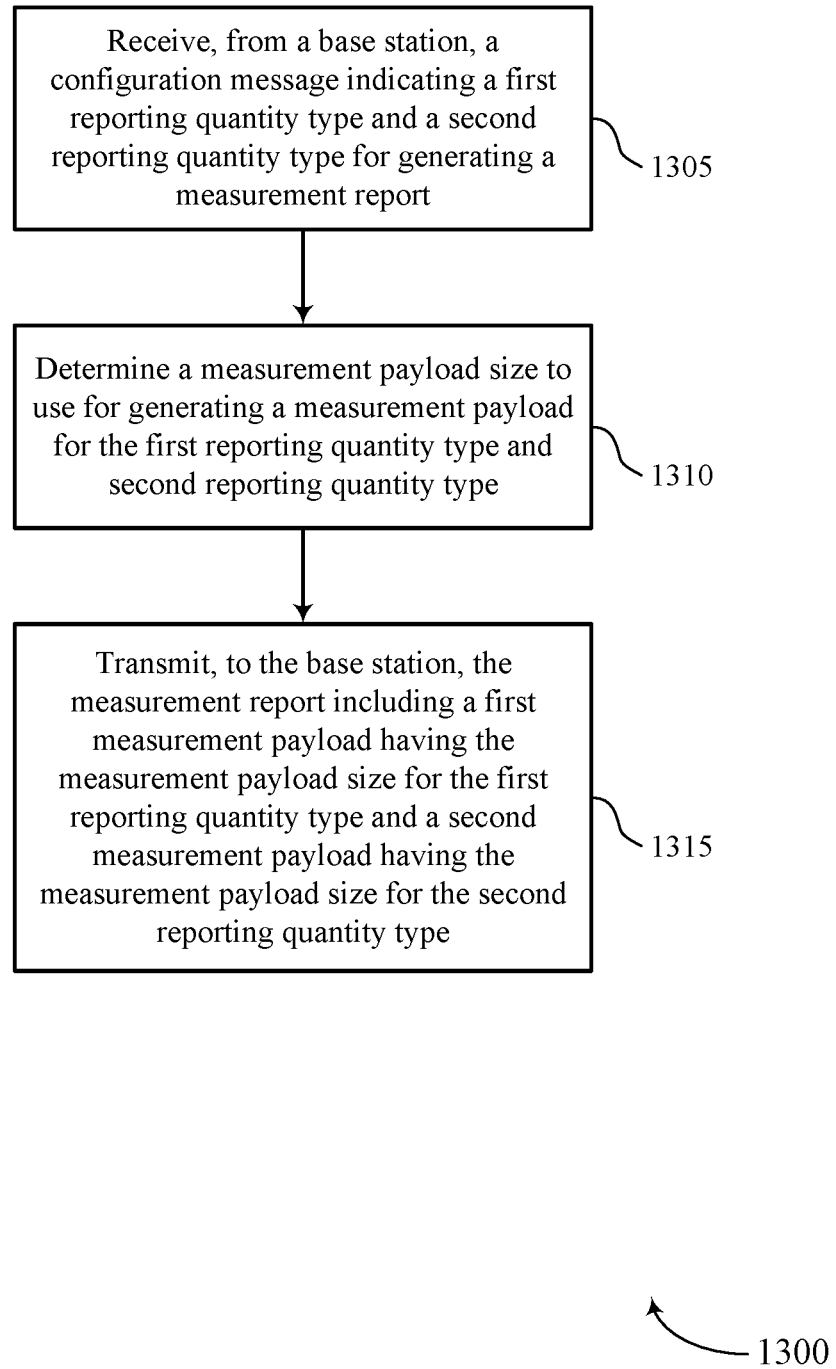
FIGS. 13 through 16 show flowcharts illustrating methods that support techniques for reporting multiple quantity types in accordance with aspects of the present disclosure.

FIG. 13 shows a flowchart illustrating a method 1300 that supports techniques for reporting multiple quantity types in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration message indicating a first reporting quantity type and a second reporting quantity type for generating a measurement report. The operations of 1305 may be performed according to the methods described herein. In some examples, aspects of the operations of 1305 may be performed by a configuration message manager as described with reference to FIGS. 5 through 8.

At 1310, the UE may determine a measurement payload size to use for generating a measurement payload for the first reporting quantity type and second reporting quantity type. The operations of 1310 may be performed according to the methods described herein. In some examples, aspects of the operations of 1310 may be performed by a payload size manager as described with reference to FIGS. 5 through 8.

At 1315, the UE may transmit, to the base station, the measurement report including a first measurement payload having the measurement payload size for the first reporting quantity type and a second measurement payload having the measurement payload size for the second reporting quantity type. The operations of 1315 may be performed according to the methods described herein. In some examples, aspects of the operations of 1315 may be performed by a measurement report manager as described with reference to FIGS. 5 through 8.

Figure 14:
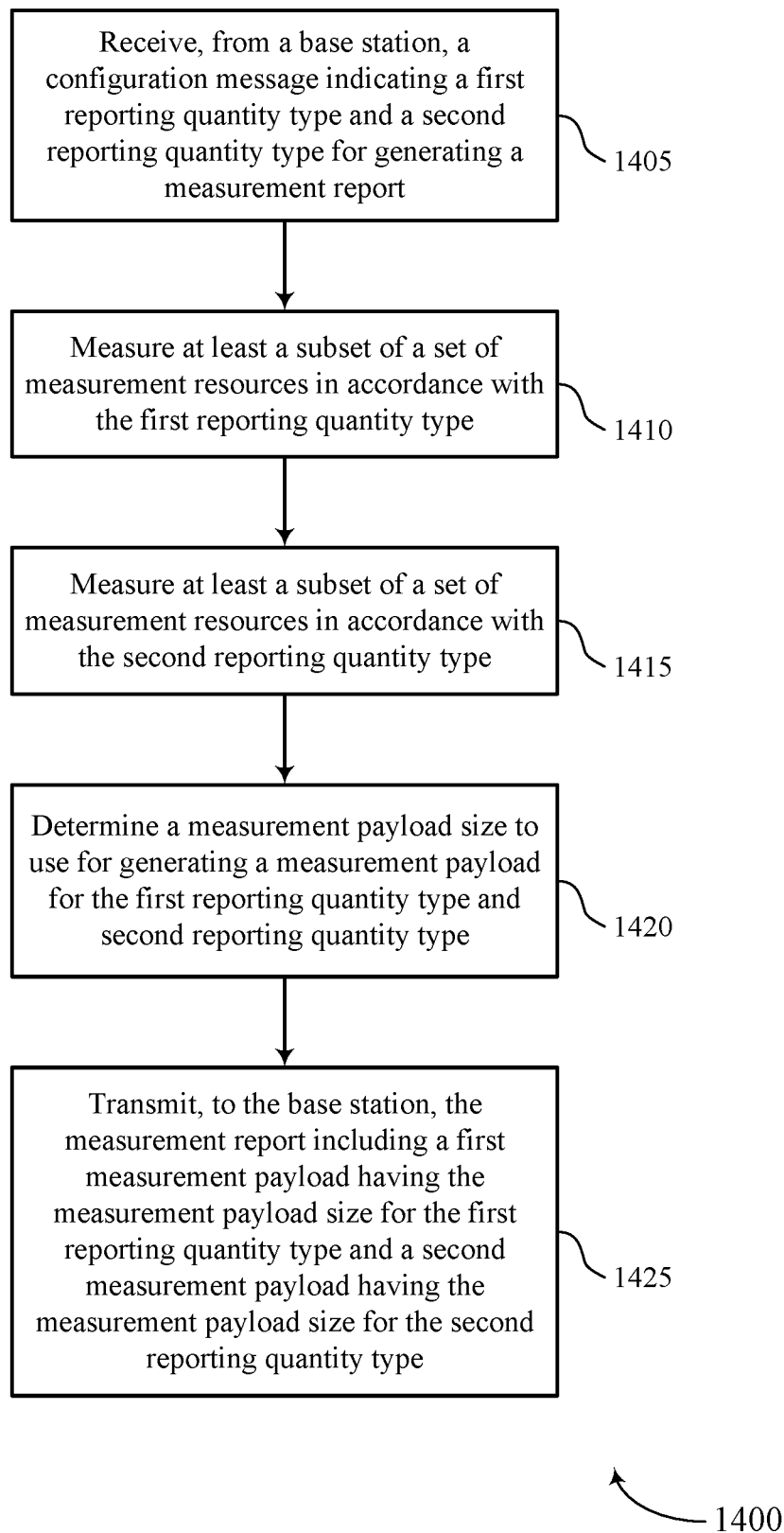

FIG. 14 shows a flowchart illustrating a method 1400 that supports techniques for reporting multiple quantity types in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration message indicating a first reporting quantity type and a second reporting quantity type for generating a measurement report. The operations of 1405 may be performed according to the methods described herein. In some examples, aspects of the operations of 1405 may be performed by a configuration message manager as described with reference to FIGS. 5 through 8.

At 1410, the UE may measure at least a subset of a set of measurement resources in accordance with the first reporting quantity type. The operations of 1410 may be performed according to the methods described herein. In some examples, aspects of the operations of 1410 may be performed by a resource measurement manager as described with reference to FIGS. 5 through 8.

At 1415, the UE may measure at least a subset of a set of measurement resources in accordance with the second reporting quantity type. The operations of 1415 may be performed according to the methods described herein. In some examples, aspects of the operations of 1415 may be performed by a resource measurement manager as described with reference to FIGS. 5 through 8.

At 1420, the UE may determine a measurement payload size to use for generating a measurement payload for the first reporting quantity type and second reporting quantity type. The operations of 1420 may be performed according to the methods described herein. In some examples, aspects of the operations of 1420 may be performed by a payload size manager as described with reference to FIGS. 5 through 8.

At 1425, the UE may transmit, to the base station, the measurement report including a first measurement payload having the measurement payload size for the first reporting quantity type and a second measurement payload having the measurement payload size for the second reporting quantity type. The operations of 1425 may be performed according to the methods described herein. In some examples, aspects of the operations of 1425 may be performed by a measurement report manager as described with reference to FIGS. 5 through 8.

Figure 15:
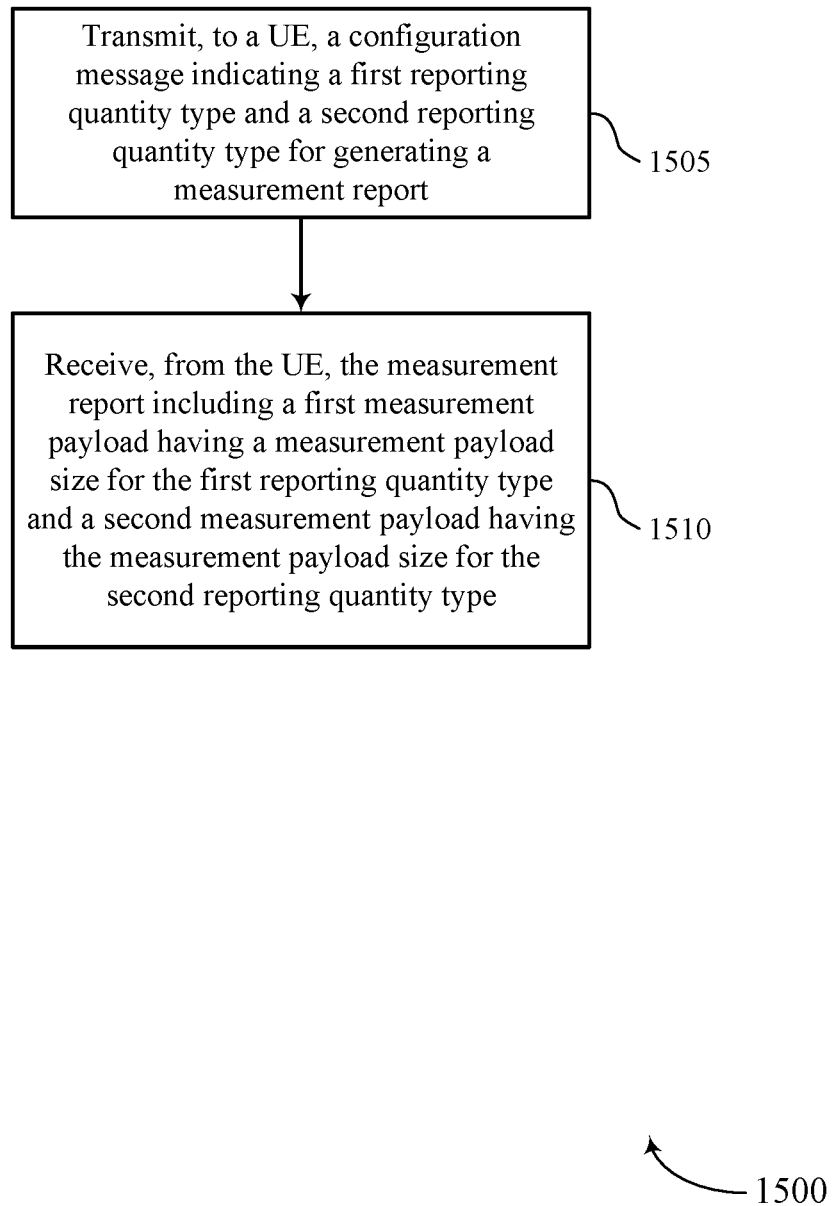

FIG. 15 shows a flowchart illustrating a method 1500 that supports techniques for reporting multiple quantity types in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a configuration message indicating a first reporting quantity type and a second reporting quantity type for generating a measurement report. The operations of 1505 may be performed according to the methods described herein. In some examples, aspects of the operations of 1505 may be performed by a configuration message component as described with reference to FIGS. 9 through 12.

At 1510, the base station may receive, from the UE, the measurement report including a first measurement payload having a measurement payload size for the first reporting quantity type and a second measurement payload having the measurement payload size for the second reporting quantity type. The operations of 1510 may be performed according to the methods described herein. In some examples, aspects of the operations of 1510 may be performed by a measurement report component as described with reference to FIGS. 9 through 12.

Figure 16:
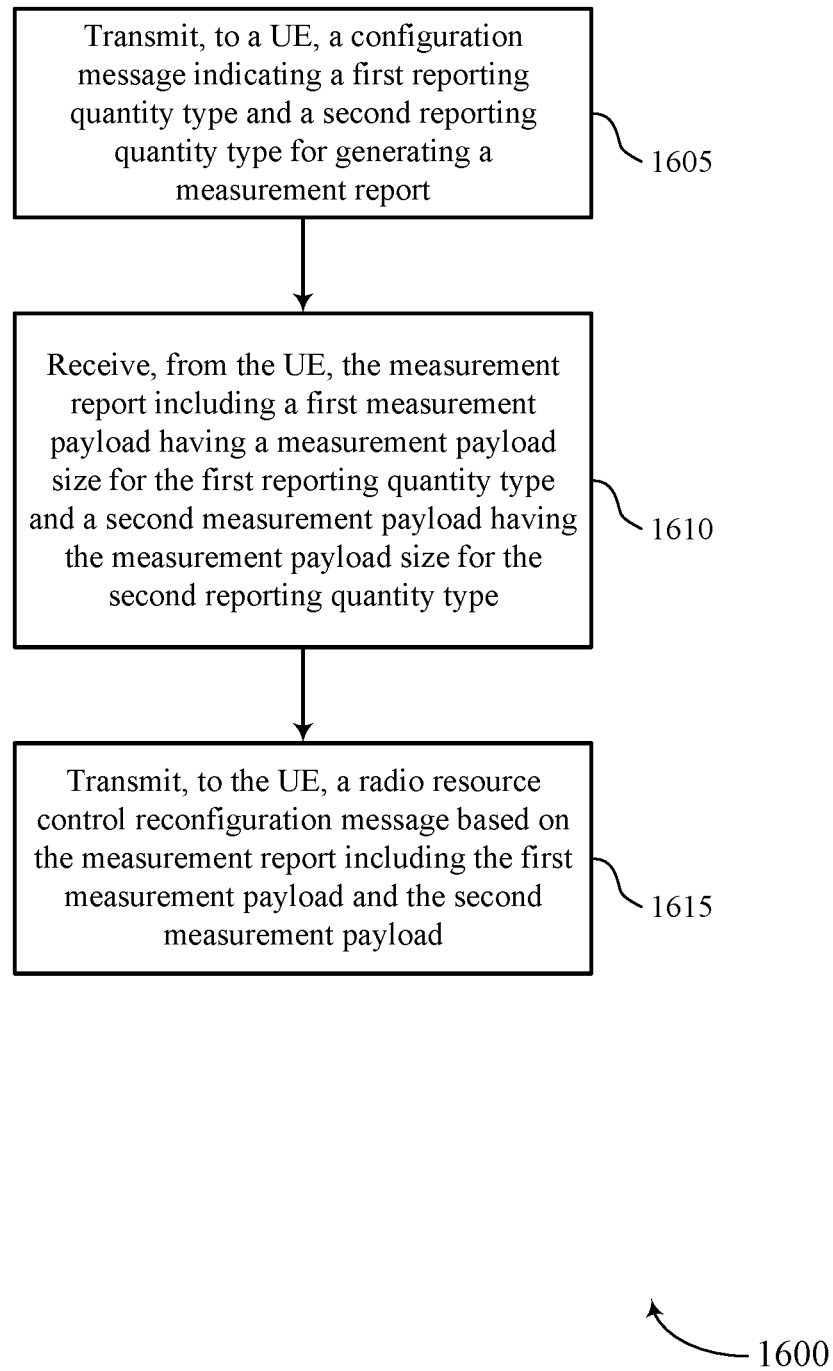

FIG. 16 shows a flowchart illustrating a method 1600 that supports techniques for reporting multiple quantity types in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration message indicating a first reporting quantity type and a second reporting quantity type for generating a measurement report. The operations of 1605 may be performed according to the methods described herein. In some examples, aspects of the operations of 1605 may be performed by a configuration message component as described with reference to FIGS. 9 through 12.

At 1610, the base station may receive, from the UE, the measurement report including a first measurement payload having a measurement payload size for the first reporting quantity type and a second measurement payload having the measurement payload size for the second reporting quantity type. The operations of 1610 may be performed according to the methods described herein. In some examples, aspects of the operations of 1610 may be performed by a measurement report component as described with reference to FIGS. 9 through 12.

At 1615, the base station may transmit, to the UE, a radio resource control reconfiguration message based on the measurement report including the first measurement payload and the second measurement payload. The operations of 1615 may be performed according to the methods described herein. In some examples, aspects of the operations of 1615 may be performed by a configuration message component as described with reference to FIGS. 9 through 12.

The following provides an overview of aspects of the present disclosure:

Aspect 1: A method for wireless communications at a UE, comprising: receiving, from a base station, a configuration message indicating a first reporting quantity type and a second reporting quantity type for generating a measurement report; determining a measurement payload size to use for generating a measurement payload for the first reporting quantity type and second reporting quantity type; and transmitting, to the base station, the measurement report comprising a first measurement payload having the measurement payload size for the first reporting quantity type and a second measurement payload having the measurement payload size for the second reporting quantity type.

Aspect 2: The method of aspect 1, wherein receiving the configuration message comprises: receiving the configuration message that indicates to use, as the measurement payload size, a larger of a first payload size associated with the first reporting quantity type and a second payload size associated with the second reporting quantity type.

Aspect 3: The method of any of aspects 1 through 2, wherein receiving the configuration message comprises: receiving the configuration message that indicates the measurement payload size, wherein the measurement payload size is determined based at least in part on the configuration message.

Aspect 4: The method of any of aspects 1 through 3, wherein receiving the configuration message further comprises: receiving the configuration message comprising an indication of a first subset of measurement resources of a plurality of measurement resources on which to report in accordance with the first reporting quantity type and a second subset of measurement resources of the plurality of measurement resources on which to report in accordance with the second reporting quantity type.

Aspect 5: The method of any of aspects 1 through 4, wherein receiving the configuration message comprises: receiving the configuration message comprising an indication of a plurality of measurement resources on which to report in accordance with the first reporting quantity type and the second reporting quantity type.

Aspect 6: The method of any of aspects 1 through 5, wherein determining the measurement payload size comprises: receiving control signaling indicating the measurement payload size.

Aspect 7: The method of aspect 6, wherein receiving the control signaling comprises: receiving the control signaling that is a radio resource control message, a medium access control element message, or a downlink control information message.

Aspect 8: The method of any of aspects 1 through 7, further comprising: receiving, from the base station, a radio resource control reconfiguration message based at least in part on the measurement report comprising the first measurement payload and the second measurement payload.

Aspect 9: The method of any of aspects 1 through 8, wherein determining the measurement payload size comprises: determining the measurement payload size based at least in part on a larger of a first payload size associated with the first reporting quantity type and a second payload size associated with the second reporting quantity type.

Aspect 10: The method of aspect 9, further comprising: generating the second measurement payload by adding one or more bits to a payload of the second reporting quantity type based at least in part on the first payload size being larger than the second payload size.

Aspect 11: The method of any of aspects 1 through 10, wherein receiving the configuration message comprises: receiving the configuration message that indicates to use a reference measurement payload size as the measurement payload size.

Aspect 12: The method of aspect 11, wherein determining the measurement payload size further comprises: determining the measurement payload size that is a reference measurement payload size for the UE to use when generating a measurement payload associated with each of the first and second reporting quantity types.

Aspect 13: The method of any of aspects 11 through 12, further comprising: generating the first measurement payload by adding one or more bits to a payload of the first reporting quantity type to generate the first measurement payload having the reference measurement payload size based at least in part on a payload size of the payload of the first reporting quantity type being less than the reference measurement payload size.

Aspect 14: The method of any of aspects 11 through 13, further comprising: generating the first measurement payload by removing one or more bits from a payload of the first reporting quantity type to generate the first measurement payload having the reference measurement payload size based at least in part on a payload size of the payload of the first reporting quantity type being greater than the reference measurement payload size.

Aspect 15: The method of any of aspects 11 through 14, further comprising: generating the first measurement payload by rounding a payload of the first reporting quantity type to generate the first measurement payload having the reference measurement payload size based at least in part on a payload size of the payload of the first reporting quantity type being greater than the reference measurement payload size.

Aspect 16: The method of any of aspects 11 through 15, wherein determining the measurement payload size comprises: retrieving the measurement payload size from a memory of the UE.

Aspect 17: The method of any of aspects 1 through 16, wherein determining the measurement payload size further comprises: determining a total payload size or a per-report payload size to use for generating the first measurement payload and the second measurement payload; and determining the measurement payload size for each of the first reporting quantity type and the second reporting quantity type based at least in part on the total payload size or the per-report payload size.

Aspect 18: The method of aspect 17, further comprising: retrieving the total payload size or the per-report payload size from a memory of the UE.

Aspect 19: The method of any of aspects 17 through 18, further comprising: receiving control signaling indicating the total payload size or the per-report payload size.

Aspect 20: The method of any of aspects 1 through 19, wherein the first reporting quantity type and the second reporting quantity type are one of a layer 1 reference signal received power measurement, or a layer 1 signal-to-interference-plus-noise ratio measurement, the first reporting quantity type and the second reporting quantity type are different.

Aspect 21: The method of any of aspects 1 through 20, wherein receiving the configuration message comprises: receiving the configuration message comprising an indication of a plurality of measurement resources that correspond to a plurality of transmission beams.

Aspect 22: The method of any of aspects 1 through 21, further comprising: measuring at least a subset of a plurality of measurement resources in accordance with the first reporting quantity type; and measuring at least a subset of a plurality of measurement resources in accordance with the second reporting quantity type.

Aspect 23: A method for wireless communications at a base station, comprising: transmitting, to a UE, a configuration message indicating a first reporting quantity type and a second reporting quantity type for generating a measurement report; and receiving, from the UE, the measurement report comprising a first measurement payload having a measurement payload size for the first reporting quantity type and a second measurement payload having the measurement payload size for the second reporting quantity type.

Aspect 24: The method of aspect 23, wherein transmitting the configuration message further comprises: transmitting the configuration message comprising an indication of a first subset of measurement resources of a plurality of measurement resources on which to report in accordance with the first reporting quantity type and a second subset of measurement resources of the plurality of measurement resources on which to report in accordance with the second reporting quantity type.

Aspect 25: The method of any of aspects 23 through 24, wherein transmitting the configuration message comprises: transmitting the configuration message comprising an indication of a plurality of measurement resources on which to report in accordance with the first reporting quantity type and the second reporting quantity type.

Aspect 26: The method of any of aspects 23 through 25, further comprising: transmitting, to the UE, a radio resource control reconfiguration message based at least in part on the measurement report comprising the first measurement payload and the second measurement payload.

Aspect 27: The method of any of aspects 23 through 26, further comprising: transmitting control signaling indicating the measurement payload size.

Aspect 28: The method of aspect 27, wherein transmitting the control signaling comprises: transmitting the control signaling that is a radio resource control message, a medium access control element message, or a downlink control information message.

Aspect 29: The method of any of aspects 23 through 28, wherein transmitting the configuration message comprises: transmitting the configuration message that indicates the measurement payload size.

Aspect 30: The method of any of aspects 23 through 29, wherein transmitting the configuration message comprises: transmitting the configuration message that indicates to use, as the measurement payload size, a larger of a first payload size associated with the first reporting quantity type and a second payload size associated with the second reporting quantity type.

Aspect 31: The method of any of aspects 23 through 30, wherein transmitting the configuration message comprises: transmitting the configuration message that indicates to use a reference measurement payload size as the measurement payload size.

Aspect 32: The method of any of aspects 23 through 31, further comprising: transmitting control signaling indicating a total payload size or a per-report payload size, wherein the measurement payload size is determined based at least in part on the control signaling.

Aspect 33: The method of any of aspects 23 through 32, wherein the first reporting quantity type and the second reporting quantity type are one of a layer 1 reference signal received power measurement, or a layer 1 signal-to-interference-plus-noise ratio measurement, the first reporting quantity type and the second reporting quantity type are different.

Aspect 34: The method of any of aspects 23 through 33, wherein transmitting the configuration message comprises: transmitting the configuration message comprising an indication of a plurality of measurement resources that correspond to a plurality of transmission beams.

Aspect 35: An apparatus for wireless communications at a UE, comprising a processor; memory coupled with the processor; and instructions stored in the memory and executable by the processor to cause the apparatus to perform a method of any of aspects 1 through 22.

Aspect 36: An apparatus for wireless communications at a UE, comprising at least one means for performing a method of any of aspects 1 through 22.

Aspect 37: A non-transitory computer-readable medium storing code for wireless communications at a UE, the code comprising instructions executable by a processor to perform a method of any of aspects 1 through 22.

Aspect 38: An apparatus for wireless communications at a base station, comprising a processor; memory coupled with the processor; and instructions stored in the memory and executable by the processor to cause the apparatus to perform a method of any of aspects 23 through 34.

Aspect 39: An apparatus for wireless communications at a base station, comprising at least one means for performing a method of any of aspects 23 through 34.

Aspect 40: A non-transitory computer-readable medium storing code for wireless communications at a base station, the code comprising instructions executable by a processor to perform a method of any of aspects 23 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network entity, a configuration message indicating a first reporting quantity type associated with a first payload bit size and a second reporting quantity type associated with a second payload bit size different from the first payload bit size for generating a measurement report;
   determining, based at least in part on the configuration message, a measurement payload bit size to use for generating a measurement payload for the first reporting quantity type and the second reporting quantity type; and
   transmitting, to the network entity, the measurement report comprising a first measurement payload having the measurement payload bit size for the first reporting quantity type and a second measurement payload having the measurement payload bit size for the second reporting quantity type.

2. The method of claim 1, wherein receiving the configuration message comprises:
   receiving the configuration message that indicates to use, as the measurement payload bit size, a larger of the first payload bit size and the second payload bit size.

3. The method of claim 1, wherein receiving the configuration message comprises:

receiving the configuration message that indicates the measurement payload bit size.

4. The method of claim 1, wherein receiving the configuration message further comprises:
receiving the configuration message comprising an indication of a first subset of measurement resources of a plurality of measurement resources on which to report in accordance with the first reporting quantity type and a second subset of measurement resources of the plurality of measurement resources on which to report in accordance with the second reporting quantity type.

5. The method of claim 1, wherein receiving the configuration message comprises:
receiving the configuration message comprising an indication of a plurality of measurement resources on which to report in accordance with the first reporting quantity type and the second reporting quantity type.

6. The method of claim 1, wherein determining the measurement payload bit size comprises:
receiving control signaling indicating the measurement payload bit size.

7. The method of claim 6, wherein receiving the control signaling comprises:
receiving the control signaling that is a radio resource control message, a medium access control element message, or a downlink control information message.

8. The method of claim 1, further comprising:
receiving, from the network entity, a radio resource control reconfiguration message based at least in part on the measurement report comprising the first measurement payload and the second measurement payload.

9. The method of claim 1, wherein determining the measurement payload bit size comprises:
determining the measurement payload bit size based at least in part on a larger of the first payload bit size and the second payload bit size.

10. The method of claim 9, further comprising:
generating the second measurement payload by adding one or more bits to a payload of the second reporting quantity type based at least in part on the first payload bit size being larger than the second payload bit size.

11. The method of claim 1, wherein receiving the configuration message comprises:
receiving the configuration message that indicates to use a reference measurement payload size as the measurement payload bit size.

12. The method of claim 11, wherein determining the measurement payload bit size further comprises:
determining the measurement payload bit size that is the reference measurement payload size for the UE to use when generating the measurement payload for the first reporting quantity type and the second reporting quantity type.

13. The method of claim 11, further comprising:
generating the first measurement payload by adding one or more bits to a payload of the first reporting quantity type to generate the first measurement payload having the reference measurement payload size based at least in part on a payload size of the payload of the first reporting quantity type being less than the reference measurement payload size.

14. The method of claim 11, further comprising:
generating the first measurement payload by removing one or more bits from a payload of the first reporting quantity type to generate the first measurement payload having the reference measurement payload size based at least in part on a payload size of the payload of the first reporting quantity type being greater than the reference measurement payload size.

15. The method of claim 11, further comprising:
generating the first measurement payload by rounding a payload of the first reporting quantity type to generate the first measurement payload having the reference measurement payload size based at least in part on a payload size of the payload of the first reporting quantity type being greater than the reference measurement payload size.

16. The method of claim 11, wherein determining the measurement payload bit size comprises:
retrieving the measurement payload bit size from a memory of the UE.

17. The method of claim 1, wherein determining the measurement payload bit size further comprises:
determining a total payload size or a per-report payload size to use for generating the first measurement payload and the second measurement payload; and
determining the measurement payload bit size for each of the first reporting quantity type and the second reporting quantity type based at least in part on the total payload size or the per-report payload size.

18. The method of claim 17, further comprising:
retrieving the total payload size or the per-report payload size from a memory of the UE.

19. The method of claim 17, further comprising:
receiving control signaling indicating the total payload size or the per-report payload size.

20. The method of claim 1, wherein the first reporting quantity type and the second reporting quantity type are one of a layer 1 reference signal received power measurement, or a layer 1 signal-to-interference-plus-noise ratio measurement, wherein the first reporting quantity type and the second reporting quantity type are different.

21. The method of claim 1, wherein receiving the configuration message comprises:
receiving the configuration message comprising an indication of a plurality of measurement resources that correspond to a plurality of transmission beams.

22. The method of claim 1, further comprising:
measuring at least a first subset of a plurality of measurement resources in accordance with the first reporting quantity type; and
measuring at least a second subset of the plurality of measurement resources in accordance with the second reporting quantity type.

23. A method for wireless communications at a network entity, comprising:
transmitting, to a user equipment (UE), a configuration message indicating a first reporting quantity type associated with a first payload bit size and a second reporting quantity type associated with a second payload bit size different from the first payload bit size for generating a measurement report; and
receiving, from the UE, the measurement report comprising a first measurement payload having a measurement payload bit size for the first reporting quantity type and a second measurement payload having the measurement payload bit size for the second reporting quantity type.

24. The method of claim 23, wherein transmitting the configuration message further comprises:
transmitting the configuration message comprising an indication of a first subset of measurement resources of a plurality of measurement resources on which to report in accordance with the first reporting quantity type and a second subset of measurement resources of the plurality of measurement resources on which to report in accordance with the second reporting quantity type.

25. The method of claim 23, wherein transmitting the configuration message comprises:
    transmitting the configuration message comprising an indication of a plurality of measurement resources on which to report in accordance with the first reporting quantity type and the second reporting quantity type.

26. The method of claim 23, further comprising:
    transmitting, to the UE, a radio resource control reconfiguration message based at least in part on the measurement report comprising the first measurement payload and the second measurement payload.

27. The method of claim 23, further comprising:
    transmitting control signaling indicating the measurement payload bit size.

28. The method of claim 27, wherein transmitting the control signaling comprises:
    transmitting the control signaling that is a radio resource control message, a medium access control element message, or a downlink control information message.

29. A user equipment (UE) for wireless communication, comprising:
    one or more memories storing processor-executable code; and
    one or more processors coupled with the one or more memories and individually or collectively operable to execute the code to cause the UE to:
        receive, from a network entity, a configuration message indicating a first reporting quantity type associated with a first payload bit size and a second reporting quantity type associated with a second payload bit size different from the first payload bit size for generating a measurement report;
        determine, based at least in part on the configuration message, a measurement payload bit size to use for generating a measurement payload for the first reporting quantity type and the second reporting quantity type; and
        transmit, to the network entity, the measurement report comprising a first measurement payload having the measurement payload bit size for the first reporting quantity type and a second measurement payload having the measurement payload bit size for the second reporting quantity type.

30. A network entity for wireless communication, comprising:
    one or more memories storing processor-executable code; and
    one or more processors coupled with the one or more memories and individually or collectively operable to execute the code to cause the network entity to:
        transmit, to a user equipment (UE), a configuration message indicating a first reporting quantity type associated with a first payload bit size and a second reporting quantity type associated with a second payload bit size different from the first payload bit size for generating a measurement report; and
        receive, from the UE, the measurement report comprising a first measurement payload having a measurement payload bit size for the first reporting quantity type and a second measurement payload having the measurement payload bit size for the second reporting quantity type.

* * * * *